United States Patent
Belghoul et al.

(10) Patent No.: US 10,531,307 B2
(45) Date of Patent: Jan. 7, 2020

(54) MECHANISMS FOR LAA/LTE-U DETECTION TO MITIGATE IMPACT ON WI-FI PERFORMANCE

(71) Applicant: Apple Inc., Cupertino, CA (US)

(72) Inventors: Farouk Belghoul, Campbell, CA (US); Lydi Smaini, San Jose, CA (US); Tarik Tabet, Los Gatos, CA (US); Syed Aon Mujtaba, Santa Clara, CA (US)

(73) Assignee: Apple Inc., Cupertino, CA (US)

( * ) Notice: Subject to any disclaimer, the term of this patent is extended or adjusted under 35 U.S.C. 154(b) by 104 days.

(21) Appl. No.: 15/430,664

(22) Filed: Feb. 13, 2017

(65) Prior Publication Data

US 2017/0251372 A1 Aug. 31, 2017

Related U.S. Application Data

(60) Provisional application No. 62/301,419, filed on Feb. 29, 2016.

(51) Int. Cl.
*H04W 16/14* (2009.01)
*H04W 48/16* (2009.01)
(Continued)

(52) U.S. Cl.
CPC ........... *H04W 16/14* (2013.01); *H04W 24/02* (2013.01); *H04W 24/08* (2013.01); *H04W 48/16* (2013.01); *H04W 84/12* (2013.01)

(58) Field of Classification Search
CPC ..... H04W 16/14; H04W 24/02; H04W 24/08; H04W 84/12
See application file for complete search history.

(56) References Cited

U.S. PATENT DOCUMENTS 9,414,386 B2 8/2016 Khawer et al.
9,479,983 B2 10/2016 Konrad
(Continued)

FOREIGN PATENT DOCUMENTS

JP     A 2008-517566     5/2008
WO     WO 2006/045097     4/2006
(Continued)

OTHER PUBLICATIONS

International Search Report and Written Opinion, Application No. PCT/US2017/018721, dated Jun. 13, 2017, 12 pages.
(Continued)

*Primary Examiner* — Robert C Scheibel
(74) *Attorney, Agent, or Firm* — Kowert Hood Munyon Rankin and Goetzel PC; Jeffrey C. Hood

(57) ABSTRACT

A wireless communication device may conduct first wireless communications over a first frequency band according to a first radio access technology (RAT), and may detect second wireless communications conducted over the first frequency band according to a second RAT while the wireless communication device is conducting the first wireless communications. The wireless communication device may then adjust characteristics and/or parameters associated with the first wireless communications based on the detected second wireless communications. In a specific example, a wireless communication device conducting Wi-Fi communications in the 5 GHz band may detect cellular communications (e.g. LAA/LTE-U communications) also conducted in the 5 GHz band while the wireless communication device is conducting the Wi Fi communications. The wireless communication device may then adjust characteristics and/or parameters associated with its Wi-Fi communications based on the detected signals/frequencies of the cellular (LAA/LTE-U) communications.

20 Claims, 19 Drawing Sheets

(51) Int. Cl.
H04W 24/02 (2009.01)
H04W 24/08 (2009.01)
H04W 84/12 (2009.01)

(56) References Cited

U.S. PATENT DOCUMENTS

| | | | | |
|---|---|---|---|---|
| 2002/0061031 | A1* | 5/2002 | Sugar | H04W 16/14 370/466 |
| 2006/0159003 | A1* | 7/2006 | Nanda | H04W 16/10 370/203 |
| 2012/0039284 | A1* | 2/2012 | Barbieri | H04W 48/10 370/329 |
| 2015/0208253 | A1 | 7/2015 | Kim et al. | |
| 2016/0037520 | A1* | 2/2016 | Wang | H04W 72/0453 370/329 |
| 2016/0119924 | A1* | 4/2016 | Lindoff | H04W 16/14 370/338 |
| 2016/0127993 | A1 | 5/2016 | Wang | |
| 2016/0174107 | A1* | 6/2016 | Kanugovi | H04L 12/28 370/236 |
| 2016/0337865 | A1* | 11/2016 | Morioka | H04W 16/14 |
| 2016/0345345 | A1* | 11/2016 | Malik | H04W 48/04 |
| 2016/0353311 | A1* | 12/2016 | Dural | H04W 24/10 |
| 2017/0078865 | A1* | 3/2017 | Santhanam | H04L 5/001 |
| 2017/0111931 | A1* | 4/2017 | Damnjanovic | H04W 74/0825 |
| 2017/0142720 | A1* | 5/2017 | Andreoli-Fang | H04W 24/02 |
| 2017/0142752 | A1* | 5/2017 | Schmidt | H04L 25/03159 |
| 2017/0245304 | A1* | 8/2017 | Andreoli-Fang | H04W 16/14 |
| 2018/0070244 | A1* | 3/2018 | Wu | H04W 16/14 |

FOREIGN PATENT DOCUMENTS

| | | |
|---|---|---|
| WO | WO 2016/002855 A1 | 1/2016 |
| WO | WO 2016/074637 | 5/2016 |

OTHER PUBLICATIONS

Office Action, Japanese Patent Application No. 2018-544103, dated Jul. 19, 2019, three pages.
Alcatel-Lucent et al.; "Channel Selection for LAA"; 3GPP TSG RAN1 Meeting WG1 #80; R1-150194; Feb. 18, 2015; five pages.
Deguchi, et al.; "A Modified Range Mapping for Irreversible Compression of High Dynamic Range Images"; Technical Report of IEICE, vol. 112, No. 486; IEICE Technical Report CAS2012-102,SIP2012-133,CS2012-108; Mar. 7, 2013; pp. 33-38.

* cited by examiner

| AC Priority | CWmin | CWmax | T-difference (AISFN) | TXOP |
|---|---|---|---|---|
| 4 AC_BE | 15 | 1023 | 7 (79us) | (8,10) or 4ms in Japan |
| 3 AC_BE | 15 | 63 | 3 (43us) | (8,10) or 4ms in Japan |
| 2 AC_VI | 7 | 15 | 1 (25us) | 3ms |
| 1 AC_VO | 3 | 7 | 1 (25us) | 2ms |

| AC | CWmin | CWmax | AIFSN | TXOP limit | | |
|---|---|---|---|---|---|---|
| | | | | For PHYs defined in Clause 16 (DSSS PHY specification for 2.4 GHz band designated for ISM applications) and Clause 17 (High rate direct sequence spread spectrum (HR/DSSS) PHY specification) | For PHYs defined in Clause 18 (Orthogonal frequency division multiplexing (OFDM) PHY specification), Clause 19 (Extended Rate PHY (ERP) specification), Clause 20 (High Throughput (HT) PHY specification), and Clause 22 (Very High Throughput (VHT) PHY specification) (11ac)(11ac) | For PHY defined in Clause 23 (Television Very High Throughput (TVHT) PHY specification (11af))(11af) | Other PHYs |
| AC_BK | aCWmin | aCWmax | 7 | 3.264 ms (#2409) | 2.528 ms (#2409)(#3776) | 0 | 0 |
| AC_BE | aCWmin | aCWmax | 3 | 3.264 ms (#2409) | 2.528 ms (#2409)(#3776) | 0 | 0 |
| AC_VI | (aCWmin+1)/ 2-1 | aCWmin | 2 | 6.016 ms | 4.096 ms (#2409) | 22.56 ms (BCU: 6 or 7 MHz), 16.92 ms (BCU: 8 MHz)(11af) | 0 |
| AC_VO | (aCWmin+1)/ 4-1 | (aCWmin+1)/ 2-1 | 2 | 3.264 ms | 2.080 ms (#2409) | 11.28 ms (BCU: 6 or 7 MHz), 8.46 ms (BCU: 8 MHz)(11af) | 0 |

| | Channel Bandwidth Configuration | | | | | |
|---|---|---|---|---|---|---|
| | 1.4 MHz | 3 MHz | 5 MHz | 10 MHz | 15 MHz | 20 MHz |
| Minimum Output Power (dBm) | -50 | | | | | |
| Transmission Bandwidth (MHz) | 1.08 | 2.7 | 4.5 | 9.0 | 13.5 | 18 |

LTE Signal

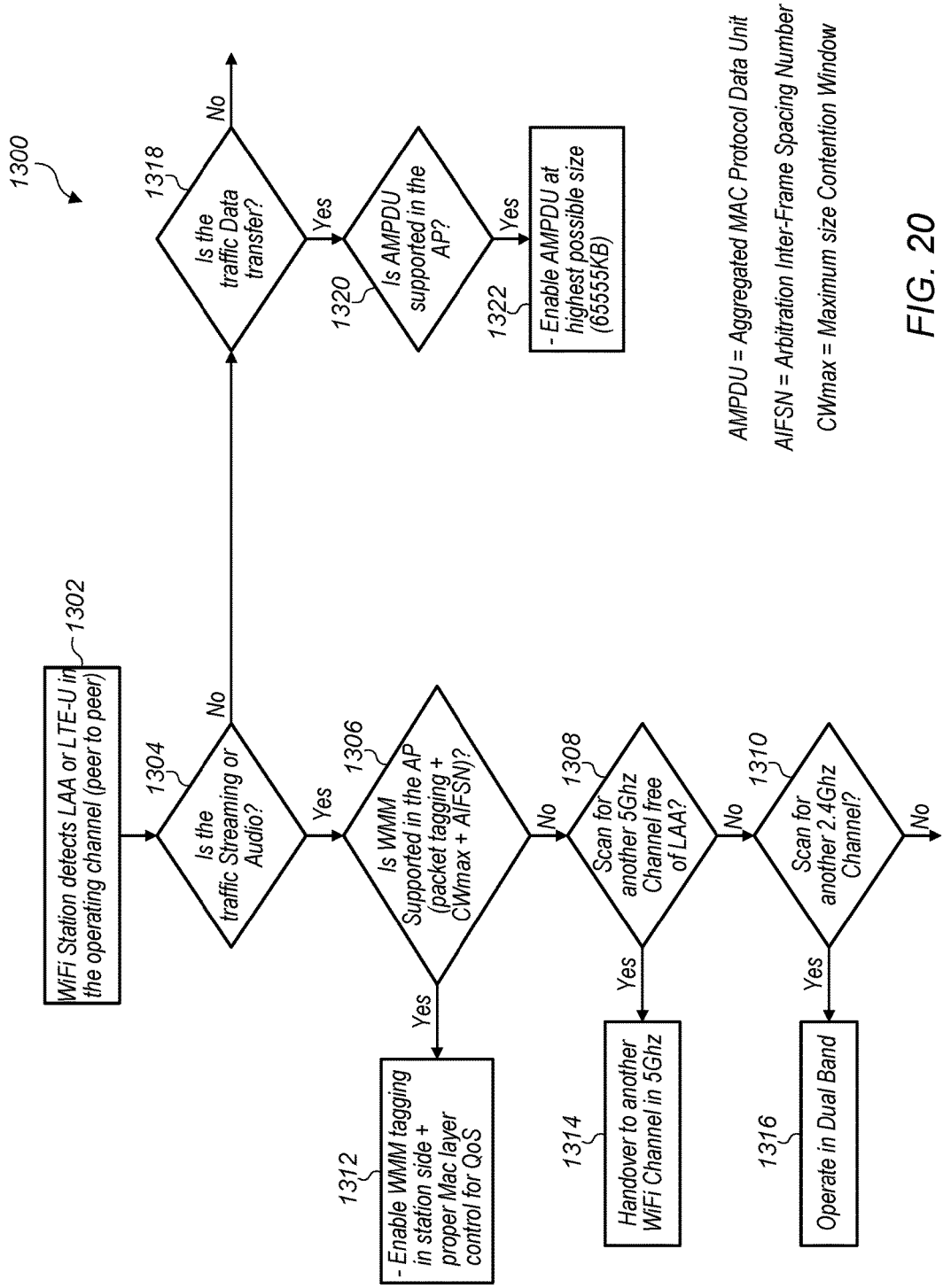

MECHANISMS FOR LAA/LTE-U DETECTION TO MITIGATE IMPACT ON WI-FI PERFORMANCE

PRIORITY CLAIM

This application claims benefit of priority of U.S. Provisional Patent Application Ser. No. 62/301,419 titled "Mechanisms for LAA/LTE-U Detection to Mitigate Impact on Wi-Fi Performance", filed on Feb. 29, 2016, which is hereby incorporated by reference as though fully and completely set forth herein.

FIELD OF THE INVENTION

The present application relates to wireless communications, and more particularly to mitigating the effects of LAA/LTE-U transmissions on Wi-Fi communications.

DESCRIPTION OF THE RELATED ART

Wireless communication systems are rapidly growing in usage. In recent years, wireless devices such as smart phones and tablet computers have become increasingly sophisticated. In addition to supporting telephone calls, many mobile devices (i.e., user equipment devices or UEs) now provide access to the internet, email, text messaging, and navigation using the global positioning system (GPS), and are capable of operating sophisticated applications that utilize these functionalities. Additionally, there exist numerous different wireless communication technologies and standards. Some examples of wireless communication standards include GSM, UMTS (WCDMA, TDS-CDMA), LTE, LTE Advanced (LTE-A), HSPA, 3GPP2 CDMA2000 (e.g., 1xRTT, 1xEV-DO, HRPD, eHRPD), IEEE 802.11 (WLAN or Wi-Fi), IEEE 802.16 (WiMAX), BLUETOOTH™, etc.

The ever increasing number of features and functionality introduced in wireless communication devices also creates a continuous need for improvement in both wireless communications and in wireless communication devices. In particular, it is important to ensure the accuracy of transmitted and received signals through user equipment (UE) devices, e.g., through wireless devices such as cellular phones, base stations and relay stations used in wireless cellular communications. In addition, increasing the functionality of a UE device can place a significant strain on the battery life of the UE device. Thus it is very important to also reduce power requirements in UE device designs while allowing the UE device to maintain good transmit and receive abilities for improved communications.

The UEs, which may be mobile telephones or smart phones, portable gaming devices, laptops, wearable devices, PDAs, tablets, portable Internet devices, music players, data storage devices, or other handheld devices, etc. may have multiple radio interfaces that enable support of multiple radio access technologies (RATs) as defined by the various wireless communication standards (LTE, LTE-A, Wi-Fi, BLUETOOTH™, etc.). The radio interfaces may be used by various applications and the presence of the multiple radio interfaces may necessitate the UE to implement mobility solutions to seamlessly run applications simultaneously over multiple radio interfaces (e.g., over LTE/LTE-A and BLUETOOTH™) without impacting the end-to-end performance of the application. That is, the UE may need to implement mobility solutions to simultaneously operate multiple radio interfaces corresponding to multiple RATs (e.g., LTE/LTE-A and BLUETOOTH™).

In addition to the communication standards mentioned above, there also exist extensions aimed at boosting transmission coverage in certain cellular networks. For example, LTE in Unlicensed spectrum (LTE-U) allows cellphone carriers to boost coverage in their cellular networks by transmitting in the unlicensed 5 GHz band which is also used by many Wi-Fi devices. License Assisted Access (LAA) describes a similar technology aimed to standardize operation of LTE in the Wi-Fi bands through the use of a contention protocol referred to as listen-before-talk (LBT), which facilitates coexistence with other Wi-Fi devices on the same band. However, the coexistence of cellular and Wi-Fi communications in the same band can still result in the degradation of data throughput and/or decreased performance of streaming applications (data streaming) when both Wi-Fi signals and LAA/LTE-U signals are present.

SUMMARY OF THE INVENTION

Embodiments are presented herein of, inter alia, of methods for detecting LAA/LTE-U signals when performing Wi-Fi communications, and mitigating the impact of those LAA/LTE-U signals on the Wi-Fi communications. Embodiments are further presented herein for wireless communication systems containing user equipment (UE) devices and/or base stations and access points (APs) communicating with each other within the wireless communication systems.

In some embodiments, a wireless communication device may conduct first wireless communications over a first frequency band according to a first radio access technology (RAT), and may also detect—while conducting the first wireless communications—second wireless communications conducted over the first frequency band according to a second RAT. The wireless communication device may then adjust characteristics and/or parameters associated with the first wireless communications in response to and based on at least the detected second wireless communications. For example, in various embodiments, a wireless communication device conducting Wi-Fi communications in the 5 GHz band may detect cellular communications (e.g. LAA/LTE-U communications) also conducted in the 5 GHz band while the wireless communication device is conducting the Wi-Fi communications. The wireless communication device may then adjust characteristics and/or parameters associated with its Wi-Fi communications based at least on the detected signals/frequencies of the cellular (LAA/LTE-U) communications.

Note that the techniques described herein may be implemented in and/or used with a number of different types of devices, including but not limited to, base stations, access points, cellular phones, portable media players, tablet computers, wearable devices, and various other computing devices.

This Summary is intended to provide a brief overview of some of the subject matter described in this document. Accordingly, it will be appreciated that the above-described features are merely examples and should not be construed to narrow the scope or spirit of the subject matter described herein in any way. Other features, aspects, and advantages of the subject matter described herein will become apparent from the following Detailed Description, Figures, and Claims.

BRIEF DESCRIPTION OF THE DRAWINGS

FIG. 9 shows a table with exemplary values for various parameters for LAA LBT;

FIG. 10 shows a table with exemplary values for various parameters for Wi-Fi Enhanced Distributed Coordination Function (EDCF);

FIG. 20 shows a flow diagram of an exemplary method for mitigating LAA impact on Wi-Fi communications in station mode of operation, according to some embodiments.

Figure 1:
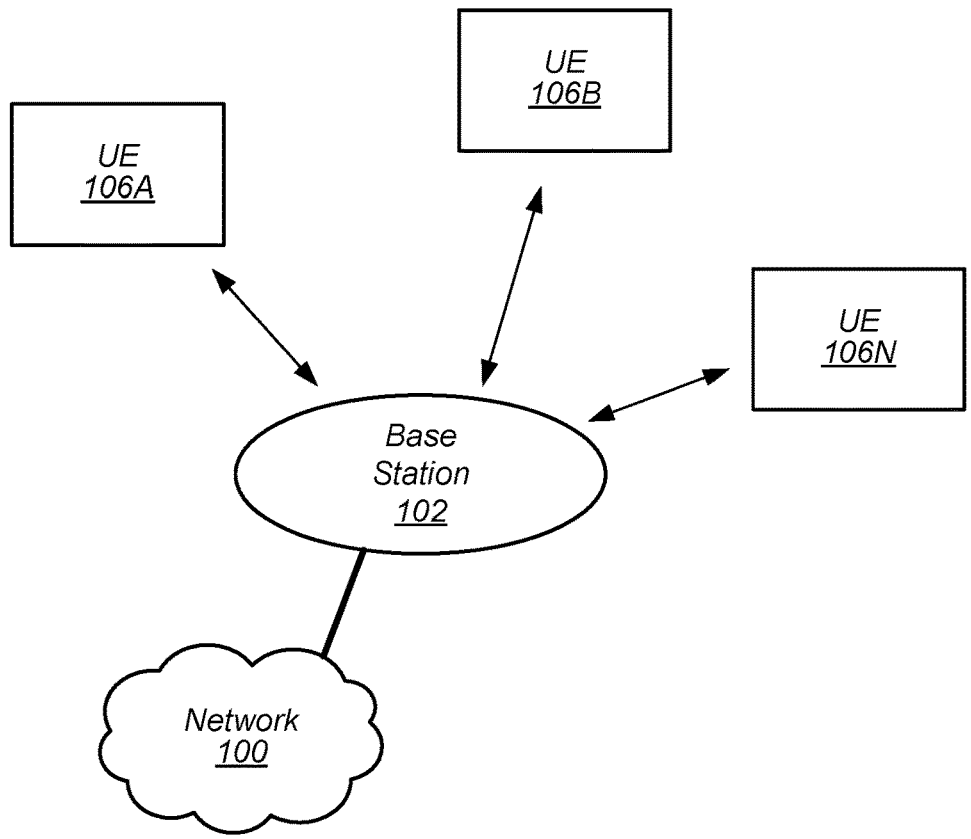
FIG. 1 illustrates an exemplary (and simplified) wireless communication system, according to some embodiments.

While features described herein are susceptible to various modifications and alternative forms, specific embodiments thereof are shown by way of example in the drawings and are herein described in detail. It should be understood, however, that the drawings and detailed description thereto are not intended to be limiting to the particular form disclosed, but on the contrary, the intention is to cover all modifications, equivalents and alternatives falling within the spirit and scope of the subject matter as defined by the appended claims.

DETAILED DESCRIPTION OF THE EMBODIMENTS

Acronyms

Various acronyms are used throughout the present application. Definitions of the most prominently used acronyms that may appear throughout the present application are provided below:

AMR-WB: Adaptive Multi-Rate Wideband
AP: Access Point
APN: Access Point Name
APR: Applications Processor
BS: Base Station
BSR: Buffer Size Report
CMR: Change Mode Request
DL: Downlink (from BS to UE)
DYN: Dynamic
EDCF: Enhanced Distributed Coordination Function
FDD: Frequency Division Duplexing
FO: First-Order state
FT: Frame Type
GPRS: General Packet Radio Service
GSM: Global System for Mobile Communication
GTP: GPRS Tunneling Protocol
IR: Initialization and Refresh state
LAN: Local Area Network
LBT: Listen Before Talk
LTE: Long Term Evolution
PDCP: Packet Data Convergence Protocol
PDN: Packet Data Network
PDU: Protocol Data Unit
PGW: PDN Gateway
PSD: Power Spectral Density
PSS: Primary Synchronization Signal
PT: Payload Type
RAT: Radio Access Technology
RF: Radio Frequency
ROHC: Robust Header Compression
RTP: Real-time Transport Protocol
RX: Reception/Receive
SID: System Identification Number
SGW: Serving Gateway
SSS: Secondary Synchronization Signal
TBS: Transport Block Size
TDD: Time Division Duplexing
TX: Transmission/Transmit
UE: User Equipment
UL: Uplink (from UE to BS)
UMTS: Universal Mobile Telecommunication System
Wi-Fi: Wireless Local Area Network (WLAN) RAT based on the Institute of Electrical and Electronics Engineers' (IEEE) 802.11 standards
WLAN: Wireless LAN Terms The following is a glossary of terms that may appear in the present application:

Memory Medium—Any of various types of memory devices or storage devices. The term "memory medium" is intended to include an installation medium, e.g., a CD- ROM, floppy disks, or tape device; a computer system memory or random access memory such as DRAM, DDR RAM, SRAM, EDO RAM, Rambus RAM, etc.; a non-volatile memory such as a Flash, magnetic media, e.g., a hard drive, or optical storage; registers, or other similar types of memory elements, etc. The memory medium may comprise other types of memory as well or combinations thereof. In addition, the memory medium may be located in a first computer system in which the programs are executed, or may be located in a second different computer system which connects to the first computer system over a network, such as the Internet. In the latter instance, the second computer system may provide program instructions to the first computer system for execution. The term "memory medium" may include two or more memory mediums which may reside in different locations, e.g., in different computer systems that are connected over a network.

Carrier Medium—a memory medium as described above, as well as a physical transmission medium, such as a bus, network, and/or other physical transmission medium that conveys signals such as electrical, electromagnetic, or digital signals.

Computer System (or Computer)—any of various types of computing or processing systems, including a personal computer system (PC), mainframe computer system, workstation, network appliance, Internet appliance, personal digital assistant (PDA), television system, grid computing system, or other device or combinations of devices. In general, the term "computer system" may be broadly defined to encompass any device (or combination of devices) having at least one processor that executes instructions from a memory medium.

User Equipment (UE) (or "UE Device")—any of various types of computer systems devices which perform wireless communications. Also referred to as wireless communication devices, many of which may be mobile and/or portable. Examples of UE devices include mobile telephones or smart phones (e.g., iPhone™, Android™-based phones) and tablet computers such as iPad™, Samsung Galaxy™, etc., gaming devices (e.g. Sony PlayStation™, Microsoft XBox™, etc.), portable gaming devices (e.g., Nintendo DS™, PlayStation Portable™, Gameboy Advance™, iPod™), laptops, wearable devices (e.g. Apple Watch™, Google Glass™), PDAs, portable Internet devices, music players, data storage devices, or other handheld devices, etc. Various other types of devices would fall into this category if they include Wi-Fi or both cellular and Wi-Fi communication capabilities and/or other wireless communication capabilities, for example over short-range radio access technologies (SRATs) such as BLUETOOTH™, etc. In general, the term "UE" or "UE device" may be broadly defined to encompass any electronic, computing, and/or telecommunications device (or combination of devices) which is capable of wireless communication and may also be portable/mobile.

Base Station (BS)—The term "Base Station" has the full breadth of its ordinary meaning, and at least includes a wireless communication station installed at a fixed location and used to communicate as part of a wireless telephone system or radio system.

Processing Element—refers to various elements or combinations of elements that are capable of performing one or more functions in a device, e.g. in a user equipment device or in a cellular network device, and/or cause the user equipment device or cellular network device to perform one or more functions. Processing elements may include, for example: processors and associated memory, portions or circuits of individual processor cores, entire processor cores, processor arrays, circuits such as an ASIC (Application Specific Integrated Circuit), programmable hardware elements such as a field programmable gate array (FPGA), as well any of various combinations of the above.

Wireless Device (or wireless communication device)—any of various types of computer systems devices which performs wireless communications using WLAN communications, SRAT communications, Wi-Fi communications and the like. As used herein, the term "wireless device" may refer to a UE device, as defined above, or to a stationary device, such as a stationary wireless client or a wireless base station. For example a wireless device may be any type of wireless station of an 802.11 system, such as an access point (AP) or a client station (UE), or any type of wireless station of a cellular communication system communicating according to a cellular radio access technology (e.g. LTE, CDMA, GSM), such as a base station or a cellular telephone, for example.

Wi-Fi—The term "Wi-Fi" has the full breadth of its ordinary meaning, and at least includes a wireless communication network or RAT that is serviced by wireless LAN (WLAN) access points and which provides connectivity through these access points to the Internet. Most modern Wi-Fi networks (or WLAN networks) are based on IEEE 802.11 standards and are marketed under the name "Wi-Fi". A Wi-Fi (WLAN) network is different from a cellular network.

Automatically—refers to an action or operation performed by a computer system (e.g., software executed by the computer system) or device (e.g., circuitry, programmable hardware elements, ASICs, etc.), without user input directly specifying or performing the action or operation. Thus the term "automatically" is in contrast to an operation being manually performed or specified by the user, where the user provides input to directly perform the operation. An automatic procedure may be initiated by input provided by the user, but the subsequent actions that are performed "automatically" are not specified by the user, i.e., are not performed "manually", where the user specifies each action to perform. For example, a user filling out an electronic form by selecting each field and providing input specifying information (e.g., by typing information, selecting check boxes, radio selections, etc.) is filling out the form manually, even though the computer system must update the form in response to the user actions. The form may be automatically filled out by the computer system where the computer system (e.g., software executing on the computer system) analyzes the fields of the form and fills in the form without any user input specifying the answers to the fields. As indicated above, the user may invoke the automatic filling of the form, but is not involved in the actual filling of the form (e.g., the user is not manually specifying answers to fields but rather they are being automatically completed). The present specification provides various examples of operations being automatically performed in response to actions the user has taken.

Station (STA)—The term "station" herein refers to any device that has the capability of communicating wirelessly, e.g. by using the 802.11 protocol. A station may be a laptop, a desktop PC, PDA, access point or Wi-Fi phone or any type of device similar to a UE. An STA may be fixed, mobile, portable or wearable. Generally in wireless networking terminology, a station (STA) broadly encompasses any device with wireless communication capabilities, and the terms station (STA), wireless client (UE) and node (BS) are therefore often used interchangeably.

Configured to—Various components may be described as "configured to" perform a task or tasks. In such contexts, "configured to" is a broad recitation generally meaning "having structure that" performs the task or tasks during operation. As such, the component can be configured to perform the task even when the component is not currently performing that task (e.g., a set of electrical conductors may be configured to electrically connect a module to another module, even when the two modules are not connected). In some contexts, "configured to" may be a broad recitation of structure generally meaning "having circuitry that" performs the task or tasks during operation. As such, the component can be configured to perform the task even when the component is not currently on. In general, the circuitry that forms the structure corresponding to "configured to" may include hardware circuits.

Various components may be described as performing a task or tasks, for convenience in the description. Such descriptions should be interpreted as including the phrase "configured to." Reciting a component that is configured to perform one or more tasks is expressly intended not to invoke 35 U.S.C. § 112, paragraph six, interpretation for that component.

Figure 2:
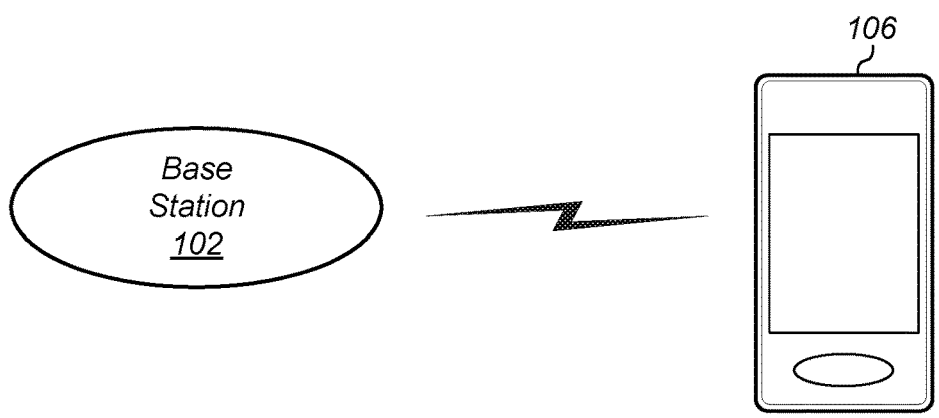
FIG. 2 illustrates an exemplary base station in communication with an exemplary wireless user equipment (UE) device, according to some embodiments.

FIGS. 1 and 2—Exemplary Communication System

FIG. 1 illustrates an exemplary (and simplified) wireless communication system, according to some embodiments. It is noted that the system of FIG. 1 is merely one example of a possible system, and embodiments may be implemented in any of various systems, as desired.

As shown, the exemplary wireless communication system includes a base station 102 which communicates over a transmission medium with one or more user devices 106-1 through 106-N. Each of the user devices may be referred to herein as a "user equipment" (UE) or UE device. Thus, the user devices 106 are referred to as UEs or UE devices. Various ones of the UE devices may operate according to a new category [definition] as detailed herein.

The base station 102 may be a base transceiver station (BTS) or cell site, and may include hardware that enables wireless communication with the UEs 106A through 106N. The base station 102 may also be equipped to communicate with a network 100 (e.g., a core network of a cellular service provider, a telecommunication network such as a public switched telephone network (PSTN), and/or the Internet, among various possibilities). Thus, the base station 102 may facilitate communication between the user devices and/or between the user devices and the network 100. The communication area (or coverage area) of the base station may be referred to as a "cell." It should also be noted that "cell" may also refer to a logical identity for a given coverage area at a given frequency. In general, any independent cellular wireless coverage area may be referred to as a "cell". In such cases a base station may be situated at particular confluences of three cells. The base station, in this uniform topology, may serve three 120 degree beam width areas referenced as cells. Also, in case of carrier aggregation, small cells, relays, etc. may each represent a cell. Thus, in carrier aggregation in particular, there may be primary cells and secondary cells which may service at least partially overlapping coverage areas but on different respective frequencies. For example, a base station may serve any number of cells, and cells served by a base station may or may not be collocated (e.g. remote radio heads). As also used herein, from the perspective of UEs, a base station may sometimes be considered as representing the network insofar as uplink and downlink communications of the UE are concerned. Thus, a UE communicating with one or more base stations in the network may also be interpreted as the UE communicating with the network.

The base station 102 and the user devices may be configured to communicate over the transmission medium using any of various radio access technologies (RATs), also referred to as wireless communication technologies, or telecommunication standards, such as GSM, UMTS (WCDMA), LTE, LTE-Advanced (LTE-A), LAA/LTE-U, 3GPP2 CDMA2000 (e.g., 1×RTT, 1×EV-DO, HRPD, eHRPD), Wi-Fi, WiMAX etc. In some embodiments, the base station 102 communicates with at least one UE using improved UL (Uplink) and DL (Downlink) decoupling, preferably through LTE or a similar RAT standard.

UE 106 may be capable of communicating using multiple wireless communication standards. For example, a UE 106 might be configured to communicate using either or both of a 3GPP cellular communication standard (such as LTE) or a 3GPP2 cellular communication standard (such as a cellular communication standard in the CDMA2000 family of cellular communication standards). Base station 102 and other similar base stations operating according to the same or a different cellular communication standard may thus be provided as one or more networks of cells, which may provide continuous or nearly continuous overlapping service to UE 106 and similar devices over a wide geographic area via one or more cellular communication standards.

The UE 106 might also or alternatively be configured to communicate using WLAN, BLUETOOTH™, one or more global navigational satellite systems (GNSS, e.g., GPS or GLONASS), one and/or more mobile television broadcasting standards (e.g., ATSC-M/H or DVB-H), etc. Other combinations of wireless communication standards (including more than two wireless communication standards) are also possible.

FIG. 2 illustrates an exemplary user equipment 106 (e.g., one of the devices 106-1 through 106-N) in communication with the base station 102, according to some embodiments. The UE 106 may be a device with wireless network connectivity such as a mobile phone, a hand-held device, a computer or a tablet, or virtually any type of wireless device. The UE 106 may include a processor that is configured to execute program instructions stored in memory. The UE 106 may perform any of the method embodiments described herein by executing such stored instructions. Alternatively, or in addition, the UE 106 may include a programmable hardware element such as an FPGA (field-programmable gate array) that is configured to perform any of the method embodiments described herein, or any portion of any of the method embodiments described herein. The UE 106 may be configured to communicate using any of multiple wireless communication protocols. For example, the UE 106 may be configured to communicate using two or more of CDMA2000, LTE, LTE-A, WLAN, or GNSS. Other combinations of wireless communication standards are also possible.

The UE 106 may include one or more antennas for communicating using one or more wireless communication protocols according to one or more RAT standards. In some embodiments, the UE 106 may share one or more parts of a receive chain and/or transmit chain between multiple wireless communication standards. The shared radio may include a single antenna, or may include multiple antennas (e.g., for MIMO) for performing wireless communications. Alternatively, the UE 106 may include separate transmit and/or receive chains (e.g., including separate antennas and other radio components) for each wireless communication protocol with which it is configured to communicate. As another alternative, the UE 106 may include one or more radios which are shared between multiple wireless communication protocols, and one or more radios which are used exclusively by a single wireless communication protocol. For example, the UE 106 may include a shared radio for communicating using either of LTE or CDMA2000 1×RTT, and separate radios for communicating using each of Wi-Fi and BLUETOOTH™. Other configurations are also possible.

Figure 3:
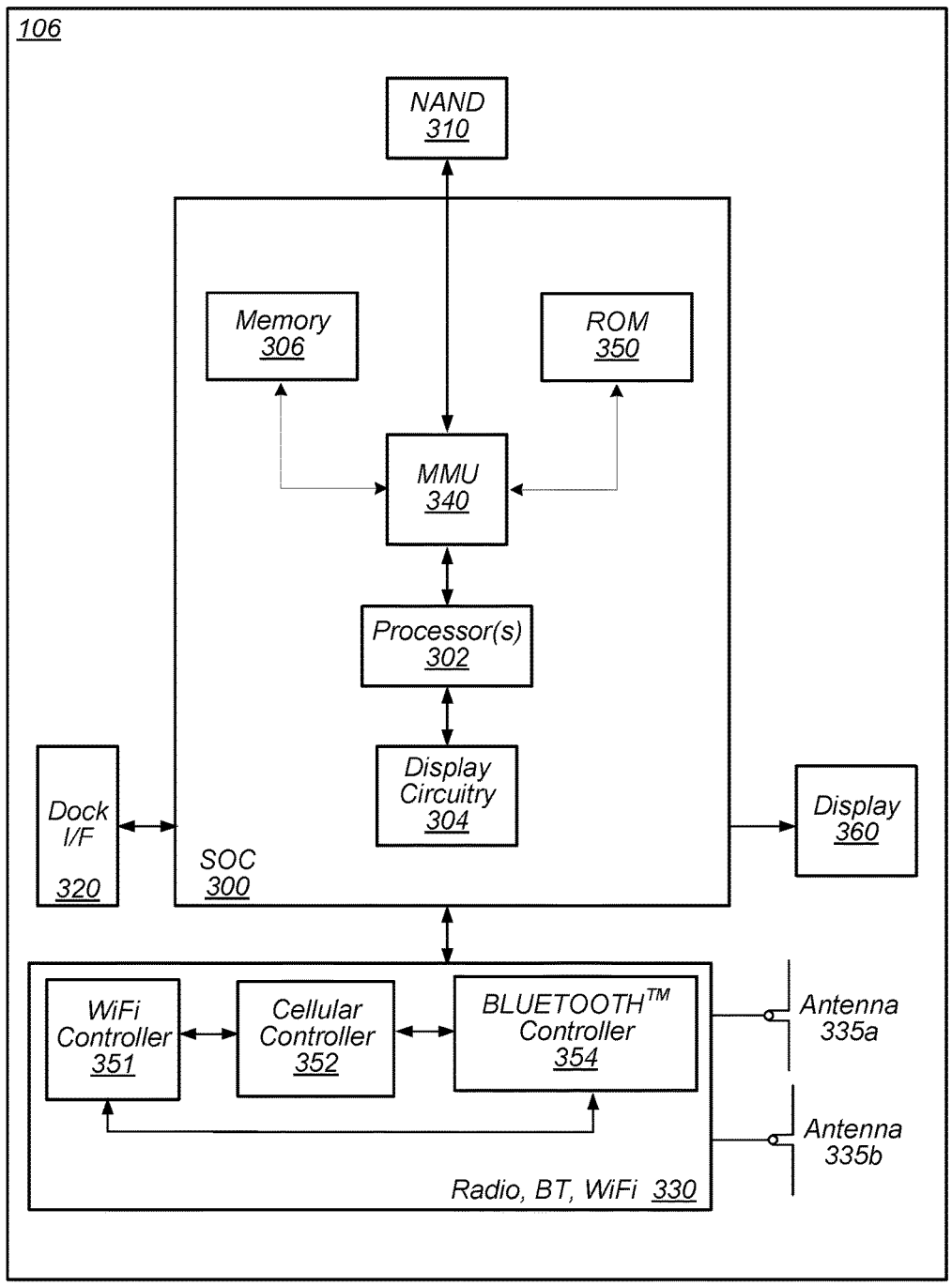
FIG. 3 illustrates an exemplary block diagram of a UE, according to some embodiments.

FIG. 3—Block Diagram of an Exemplary UE

FIG. 3 illustrates a block diagram of an exemplary UE 106, according to some embodiments. As shown, the UE 106 may include a system on chip (SOC) 300, which may include portions for various purposes. For example, as shown, the SOC 300 may include processor(s) 302 which may execute program instructions for the UE 106 and display circuitry 304 which may perform graphics processing and provide display signals to the display 360. The processor(s) 302 may also be coupled to memory management unit (MMU) 340, which may be configured to receive addresses from the processor(s) 302 and translate those addresses to locations in memory (e.g., memory 306, read only memory (ROM) 350, NAND flash memory 310) and/or to other circuits or devices, such as the display circuitry 304, radio 330, connector I/F 320, and/or display 360. The MMU 340 may be configured to perform memory protection and page table translation or set up. In some embodiments, the MMU 340 may be included as a portion of the processor(s) 302.

As shown, the SOC 300 may be coupled to various other circuits of the UE 106. For example, the UE 106 may include various types of memory (e.g., including NAND flash 310), a connector interface 320 (e.g., for coupling to the computer system), the display 360, and wireless communication circuitry (e.g., for LTE, LTE-A, CDMA2000, BLUETOOTH™, Wi-Fi, GPS, etc.). The UE device 106 may include at least one antenna (e.g. 335*a*), and possibly multiple antennas (e.g. illustrated by antennas 335*a* and 335*b*), for performing wireless communication with base stations and/or other devices. Antennas 335*a* and 335*b* are shown by way of example, and UE device 106 may include fewer or more antennas. Overall, the one or more antennas are collectively referred to as antenna(s) 335. For example, the UE device 106 may use antenna(s) 335 to perform the wireless communication with the aid of radio circuitry 330. As noted above, the UE may be configured to communicate wirelessly using multiple wireless communication standards in some embodiments.

As described further subsequently herein, the UE 106 (and/or base station 102) may include hardware and software components for implementing methods for at least UE 106 to detect LAA/LTE-U signals and mitigate the impact of those signals on communications taking place within the same band but according to different RATs, for example according to Wi-Fi. Thus, in some embodiments, UE 106 may detect LAA/LTE-U signals and mitigate the impact of those signals on Wi-Fi communications performed by UE 106. The processor(s) 302 of the UE device 106 may be configured to implement part or all of the methods described herein, e.g., by executing program instructions stored on a memory medium (e.g., a non-transitory computer-readable memory medium). In other embodiments, processor(s) 302 may be configured as a programmable hardware element, such as an FPGA (Field Programmable Gate Array), or as an ASIC (Application Specific Integrated Circuit). Furthermore, processor(s) 302 may be coupled to and/or may interoperate with other components as shown in FIG. 3, to implement communications by UE 106 that incorporate mitigating the effect of LAA/LTE-U communications on Wi-Fi communications by UE 106 according to various embodiments disclosed herein. Specifically, processor(s) 302 may be coupled to and/or may interoperate with other components as shown in FIG. 3 to facilitate UE 106 communicating in a manner that seeks to optimize Wi-Fi communications of UE 106 through the detection of LAA/LTE-U signals. Processor(s) 302 may also implement various other applications and/or end-user applications running on UE 106.

In some embodiments, radio 330 may include separate controllers dedicated to controlling communications for various respective RAT standards. For example, as shown in FIG. 3, radio 330 may include a Wi-Fi controller 351, a cellular controller (e.g. LTE controller) 352, and BLUETOOTH' controller 354, and in at least some embodiments, one or more or all of these controllers may be implemented as respective integrated circuits (ICs or chips, for short) in communication with each other and with SOC 300 (and more specifically with processor(s) 302). For example, Wi-Fi controller 351 may communicate with cellular controller 352 over a cell-ISM link or WCI interface, and/or BLUETOOTH' controller 354 may communicate with cellular controller 352 over a cell-ISM link, etc. While three separate controllers are illustrated within radio 330, other embodiments have fewer or more similar controllers for various different RATs that may be implemented in UE device 106.

Figure 4:
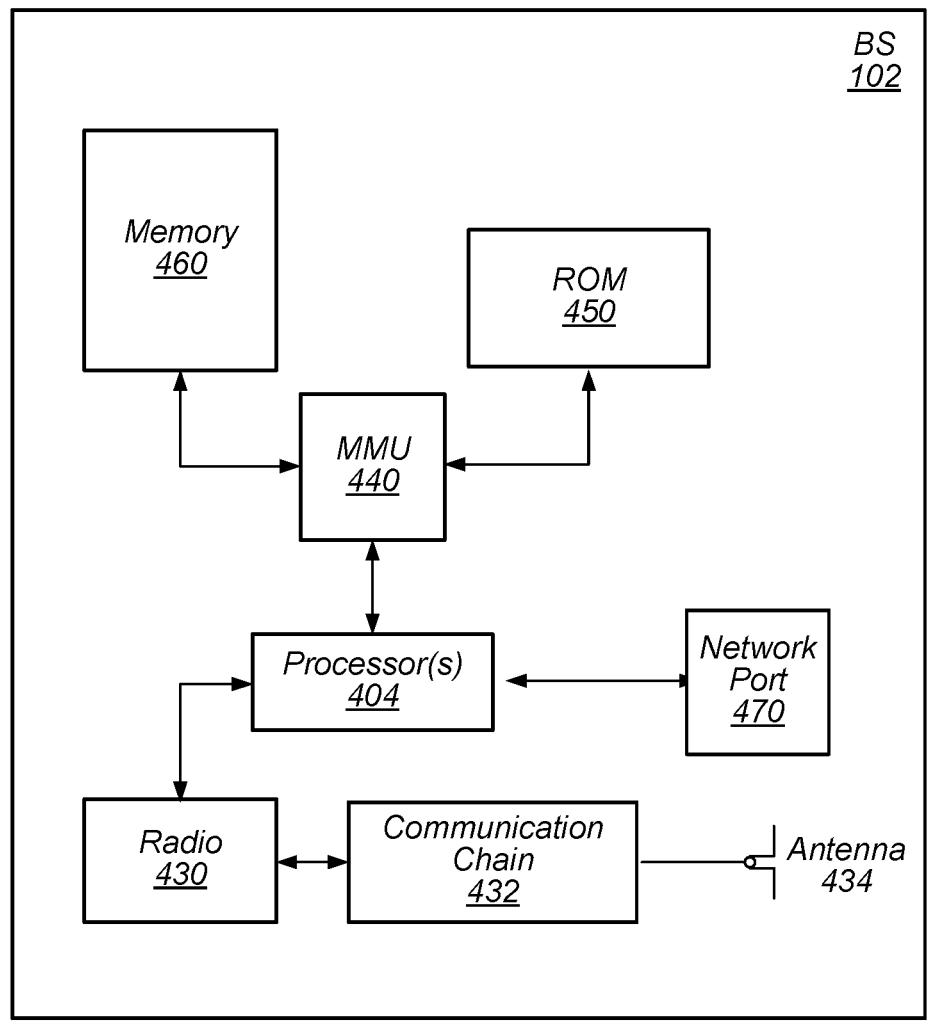
FIG. 4 illustrates an exemplary block diagram of a base station, according to some embodiments.

FIG. 4—Block Diagram of an Exemplary Base Station

FIG. 4 illustrates a block diagram of an exemplary base station 102, according to some embodiments. It is noted that the base station of FIG. 4 is merely one example of a possible base station. As shown, the base station 102 may include processor(s) 404 which may execute program instructions for the base station 102. The processor(s) 404 may also be coupled to memory management unit (MMU) 440, which may be configured to receive addresses from the processor(s) 404 and translate those addresses to locations in memory (e.g., memory 460 and read only memory (ROM) 450) or to other circuits or devices.

The base station 102 may include at least one network port 470. The network port 470 may be configured to couple to a telephone network and provide a plurality of devices, such as UE devices 106, access to the telephone network as described above in FIGS. 1 and 2. The network port 470 (or an additional network port) may also or alternatively be configured to couple to a cellular network, e.g., a core network of a cellular service provider. The core network may provide mobility related services and/or other services to a plurality of devices, such as UE devices 106. In some cases, the network port 470 may couple to a telephone network via the core network, and/or the core network may provide a telephone network (e.g., among other UE devices serviced by the cellular service provider).

The base station 102 may include at least one antenna 434, and possibly multiple antennas. The at least one antenna 434 may be configured to operate as a wireless transceiver and may be further configured to communicate with UE devices 106 via radio 430. The antenna 434 communicates with the radio 430 via communication chain 432. Communication chain 432 may be a receive chain, a transmit chain or both. The radio 430 may be designed to communicate via various wireless telecommunication standards, including, but not limited to, LTE, LTE-A WCDMA, CDMA2000, etc. The processor(s) 404 of the base station 102 may be configured to implement part or all of the methods described herein, e.g., by executing program instructions stored on a memory medium (e.g., a non-transitory computer-readable memory medium), for base station 102 to communicate with a UE device capable of detecting LAA/LTE-U signals and mitigating the effects of those signals on Wi-Fi communications performed by the UE device. Alternatively, the processor(s) 404 may be configured as a programmable hardware element, such as an FPGA (Field Programmable Gate Array), or as an ASIC (Application Specific Integrated Circuit), or a combination thereof. In the case of certain RATs, for example Wi-Fi, base station 102 may be designed as an access point (AP), in which case network port 470 may be implemented to provide access to a wide area network and/or local area network (s), e.g. it may include at least one Ethernet port, and radio 430 may be designed to communicate according to the Wi-Fi standard. Base station 102 may operate according to the various methods as disclosed herein for communicating with mobile devices capable of mitigating the presence and effects of LAA/LTE-U signals on Wi-Fi communications (also) performed by the mobile devices.

Figure 5:
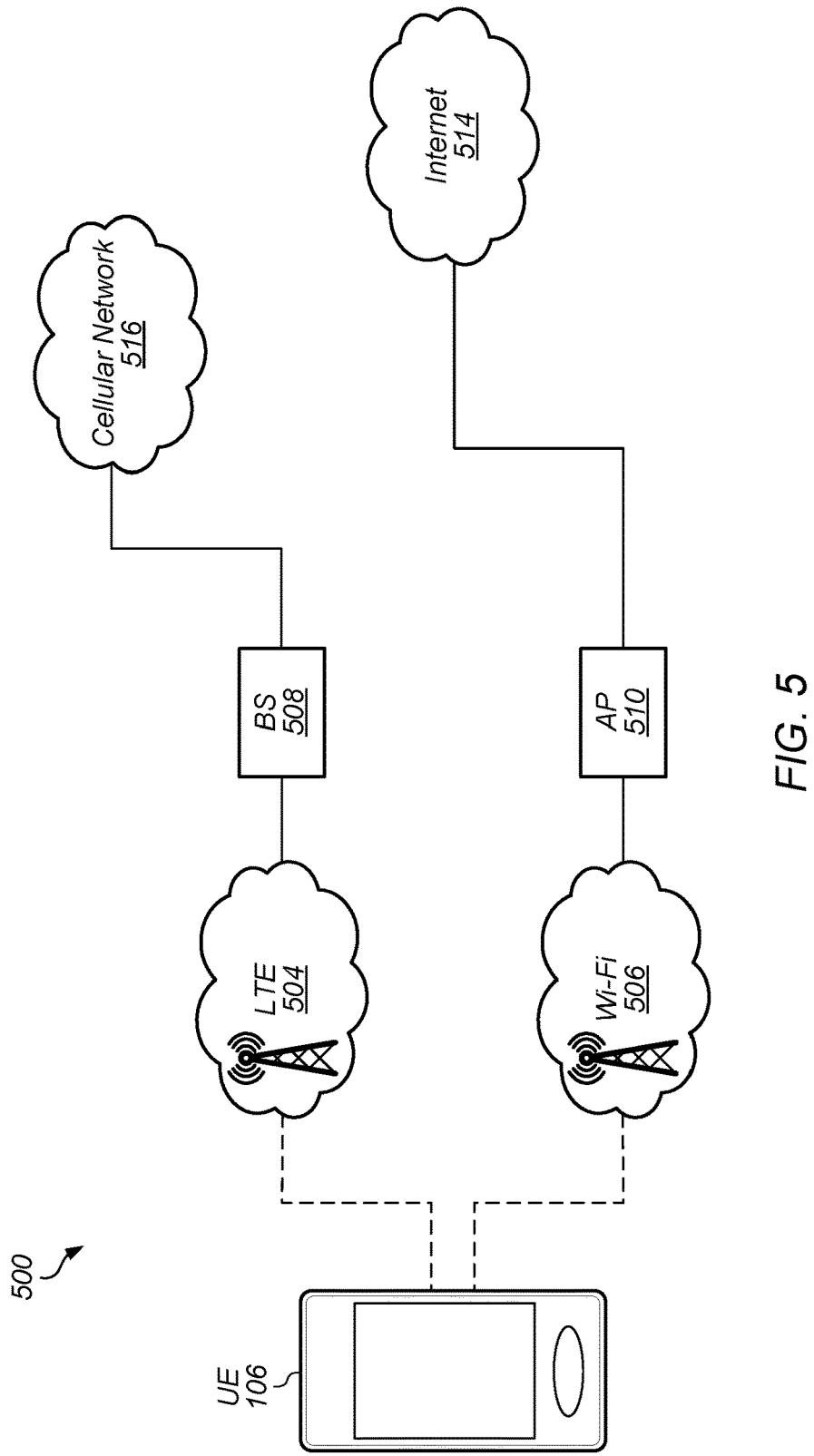
FIG. 5 illustrates an exemplary wireless communication system, according to some embodiments.

FIG. 5—Exemplary Communication System

FIG. 5 illustrates an exemplary wireless communication system 500 in accordance with some embodiments. System 500 is a system in which an LTE access network and a Wi-Fi radio access network are implemented. The system 500 may include UE 106 and LTE network 504 and Wi-Fi network 506.

LTE access network 504 is representative of some embodiments of a first RAT access and Wi-Fi access network 506 is representative of some embodiments of a second RAT access. LTE access network 504 may be interfaced with a broader cellular network (e.g. LTE network) and Wi-Fi access network 506 may be interfaced with the Internet 514. More particularly, LTE access network 504 may be interfaced with a serving base station (BS) 508, which may in turn provide access to broader cellular network 516. The Wi-Fi access network 506 may be interfaced with an access point (AP) 510, which may in turn provide access to the Internet 514. UE 106 may accordingly access Internet 514 via AP 510 and may access cellular network 516 via LTE access network 504. In some embodiments, not shown, UE 106 may also access Internet 514 via LTE access network 504. More specifically, LTE access network 504 may be interfaced with a serving gateway, which may in turn be interfaced with a packet data network (PDN) gateway. The PDN gateway may, in turn, be interfaced with Internet 514. UE 106 may accordingly access Internet 514 via either or both of LTE access network 504 and Wi-Fi access network 506.

Figure 6:
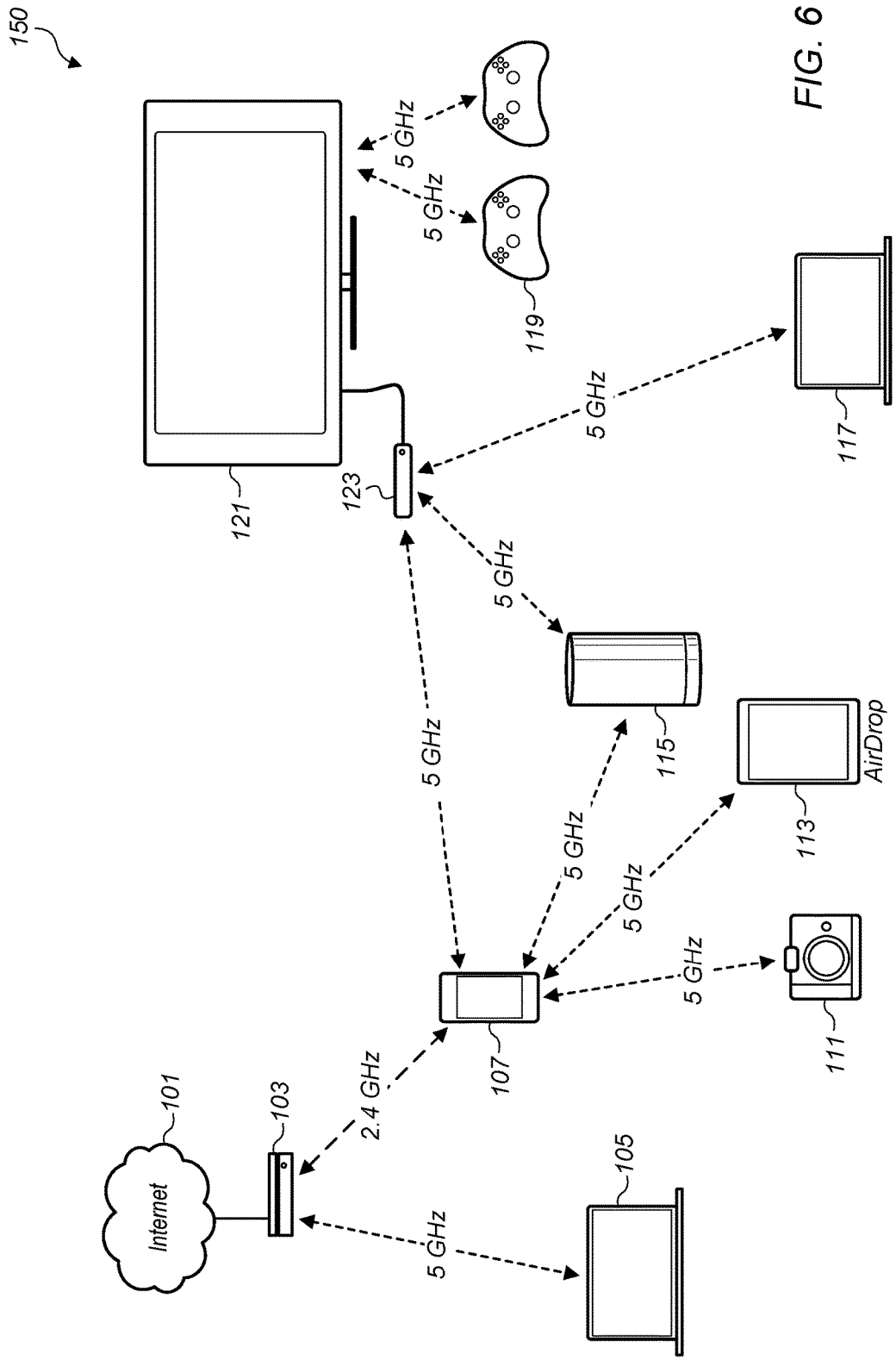
FIG. 6 shows an exemplary communication system in which multiple different devices may communicate with each other over a specific band, such as 2.4 GHz and/or 5 GHz frequency bands using Wi-Fi.

FIG. 6—Exemplary Communication System with Multiple Wi-Fi Devices

FIG. 6 shows an exemplary communication system in which multiple different devices may communicate with each other over a specific band, such as 2.4 GHz and/or 5 GHz frequency bands using Wi-Fi RAT. 5 GHz Wi-Fi (IEEE 802.11 ac/n) capable devices have become quite common, operating in both peer-to-peer mode and/or station mode, as shown in FIG. 6. Data communications over a specific frequency band, e.g. over the 5 GHz band may include Voice, Video, real time and best effort type of traffic. Illustrated devices include cameras (111), tablets (113), media servers/mini-servers (115), portable computers (105, 117), access ports/routers (103), game controllers (119), mobile devices such as smart phones (107), and smart monitors (121) or monitors with wireless access interface (121 together with 123). As shown in FIG. 6, many of the devices may communicate over the 5 GHz band, using Wi-Fi communication technology. In some cases the Wi-Fi communications conducted by the devices may be affected by LAA/LTE-U communications also taking place over the 5 GHz band.

Presence of LAA/LTE-U Signals

In LTE, carrier aggregation (CA) refers to the process of aggregating two or more component carriers (CCs) in order to support wider transmission bandwidths, e.g. bandwidths of up to 100 MHz. A UE may simultaneously receive or transmit on one or multiple CCs depending on the UE's capabilities. When CA is configured, the UE may maintain one RRC connection with the network. The serving cell managing the UE's RRC connection is referred to as the Primary Cell (PCell), and Secondary Cells (SCells) together with the PCell may form a set of serving cells. In CA, a UE may be scheduled via PDCCH over multiple serving cells simultaneously. Cross-carrier scheduling with the Carrier Indicator Field (CIF) allows the PDCCH of a serving cell to schedule resources on another serving cell. That is, a UE receiving a downlink assignment on one CC may receive associated data on another CC.

Figure 7:
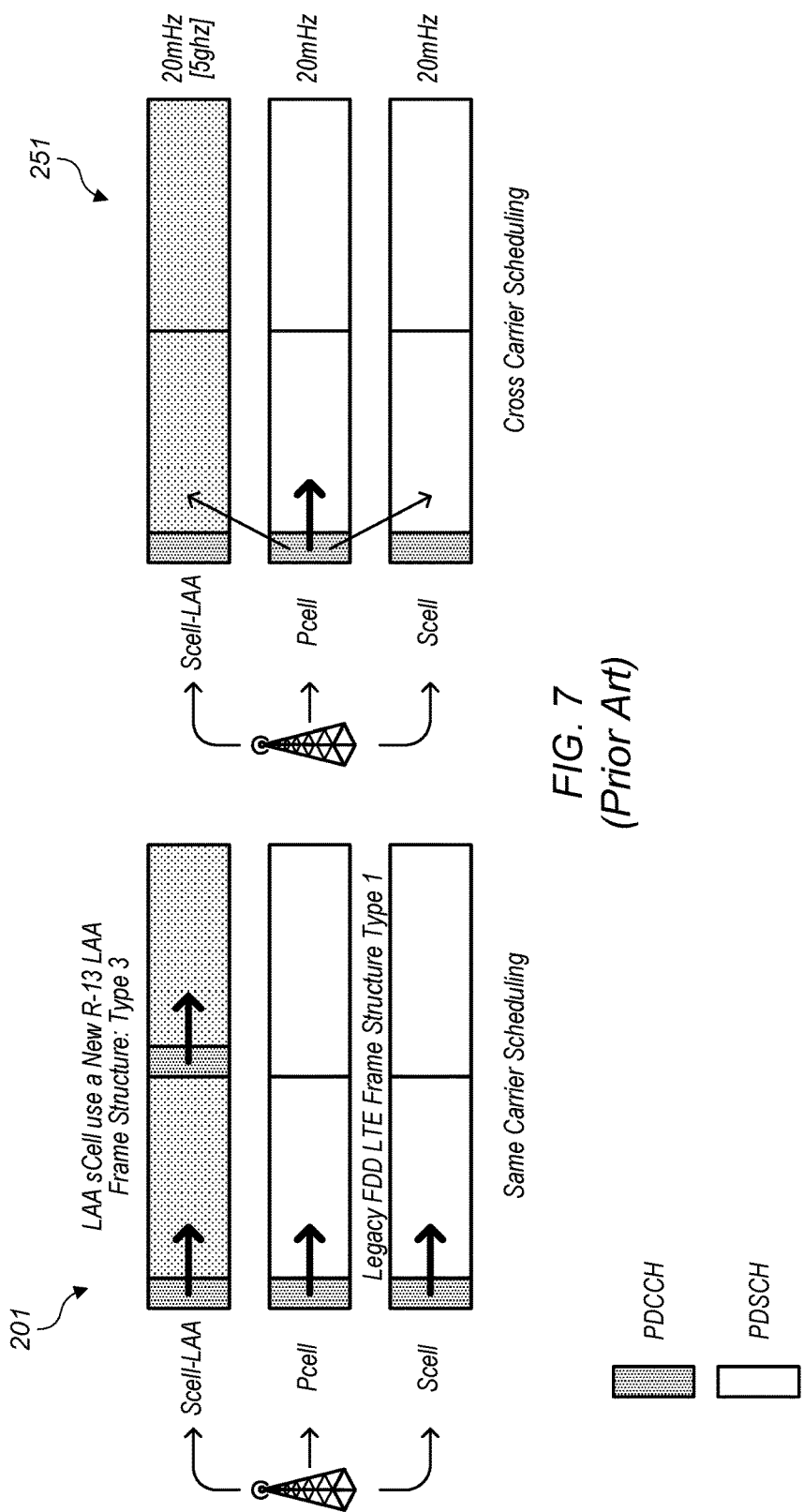
FIG. 7 shows an example of typical License Assisted Access (LAA) control and data scheduling.

LAA is a sub-category of LTE inter-band carrier aggregation, where one of the secondary carriers is operating in an unlicensed (e.g. 5 GHz) band, a band over which communications according to another RAT, such as Wi-Fi may also be taking place. Resources in an LAA carrier are scheduled in the same manner as in legacy CA. That is, carrier scheduling and/or cross layer scheduling for LAA carriers are the same as for other CA carriers (PDCCH or ePDCCH). An LAA Scell may operate in a frame structure 3 composed of 20 slots, and may be accessed following a successful listen-before-talk (LBT) procedure. FIG. 7 shows an example of typical LAA control and data scheduling, providing a respective example for same carrier scheduling (201) and a respective example for cross carrier scheduling (251), assuming a successfully completed LBT procedure in the previous subframe. If a start position of the Radio Resource Control (RRC) subframe indicates 's07', and no DCI is received in slot1, the UE may read the PDCC/ePDCCH of slot2 to check downlink data availability.

Figure 8:
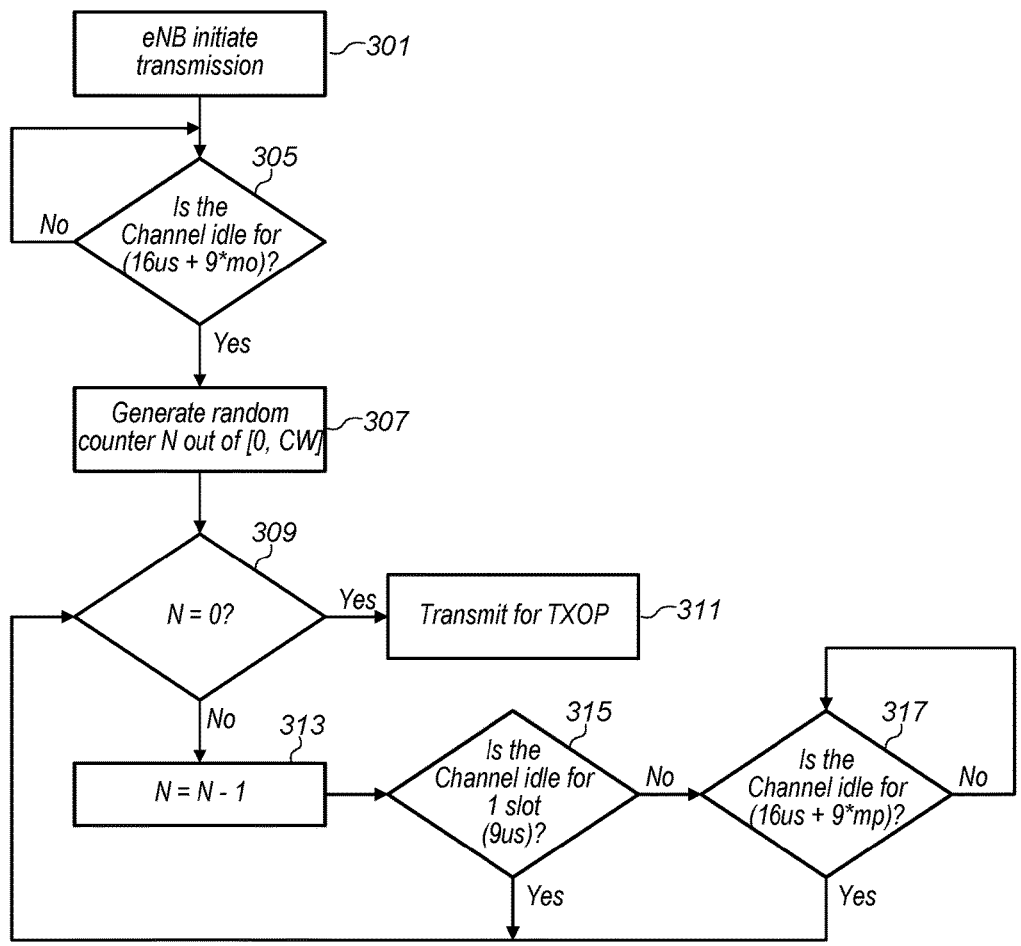
FIG. 8 shows an exemplary flowchart for Listen Before Talk (LBT) procedures.

FIG. 8 shows an exemplary flowchart for LBT procedures. FIG. 9 shows a table with exemplary values for various parameters for LAA LBT. FIG. 10 shows a table with exemplary values for the same parameters for Wi-Fi EDCF (Enhanced Distributed Coordination Function) in the 5 GHz band. As previously mentioned, the presence of LAA communications (in the 5 GHz band) may lead to performance degradation of signal throughput as well as decreased performance of real-time VoIP and/or video transmissions of Wi-Fi communications (in the 5 GHz band).

Detection of LAA/LTE-U Signals

In some embodiments, wireless communication devices operating according to a first RAT in a specified frequency band may be configured to detect wireless signals from communications performed according to a second RAT in the same frequency band while the wireless communication devices are communicating according to the first RAT in the specified frequency band. For example, in some embodiments, wireless communication devices (e.g. Wi-Fi stations and access points) that perform Wi-Fi communications in the 5 GHz band in peer-to-peer mode may detect LAA signals. In one set of embodiments, the signal detection may be performed through PSD (power spectral density) bandwidth differentiation and/or through blind PSS/SSS (Primary Synchronization Signal/Secondary Synchronization Signal) decoding. The detection may be performed dynamically during normal Wi-Fi RX Operations or during a Dynamic Frequency Selection Procedure (radar scan procedure). In another set of embodiments, peer-to-peer wireless links may be used for crowdsourcing the location of LAA small cells and LAA operating frequencies. That is, through real time information/data obtained via the peer-to-peer wireless links from different respective locations, the location of LAA small cells and LAA operating frequencies may be determined. Furthermore, LTE modem signaling may be used to acquire information about LAA channels, which may be applicable in case of wireless communication devices performing both cellular and Wi-Fi communications (e.g. smart phones, tablets, etc.)

Based on the LAA signal detection, the impact of the LAA signals on the Wi-Fi traffic (whether operating in station mode or peer-to-peer mode) may be mitigated. Characteristics and/or parameters associated with Wi-Fi communications that may be adjusted include Wi-Fi Rate Adaptation (AMPDU), Wi-Fi Channel/Band Selection, Wi-Fi Voice/Video traffic tagging WMM (Wi-Fi Multimedia), Wi-Fi Gaming/control traffic WWM, and/or data traffic just to name a few.

LTE Signals and Wi-Fi Signals

Figure 11:
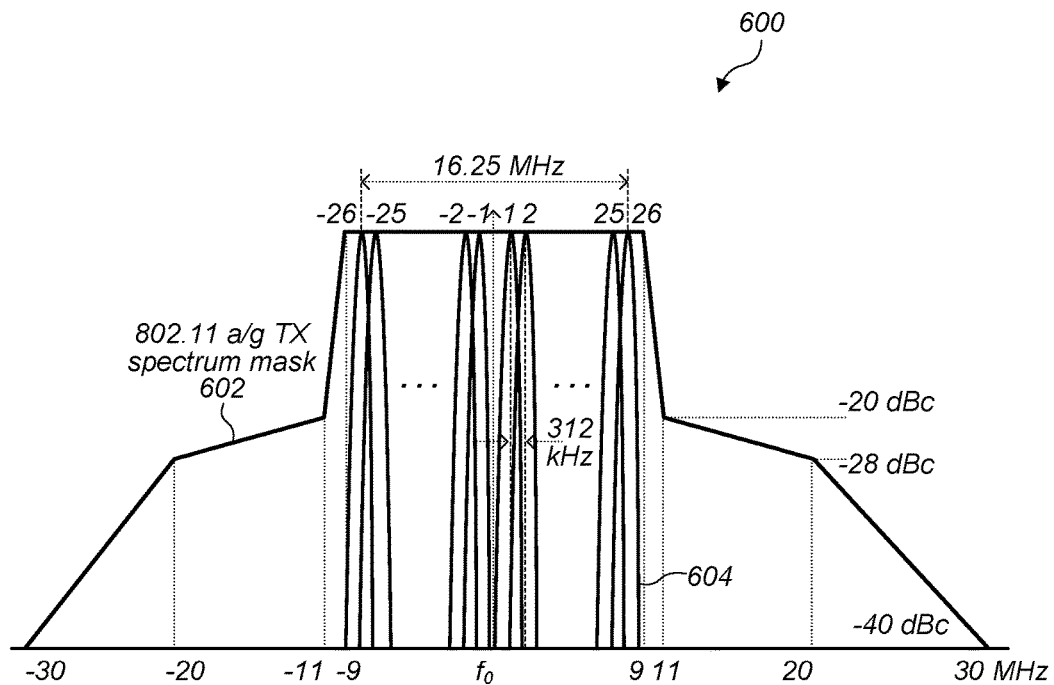
FIG. 11 shows a table with exemplary values of the respective minimum output power and transmission bandwidth (BW) corresponding to different channel BW configurations for Long Term Evolution (LTE) signals, and also shows an exemplary diagram plotting minimum output power over the applicable frequency spectrum for certain Wi-Fi signals.

By way of example, a 20 MHz LTE signal may effectively occupy a transmit BW of 18 MHz. In such a case the signal may occupy 1200 subcarriers (in other words, the number of subcarriers occupied by the signal is 1200), where each subcarrier is 15 KHz wide (that is, each subcarrier has a BW of 15 KHz). Table 650 in FIG. 11 provides an exemplary summary of the respective minimum output power (in dBm) and transmission BW corresponding to different channel BW configurations for LTE signals. In contrast, a 20 MHz Wi-Fi signal may effectively occupy a BW of 16.25 MHz, with 52 subcarriers of 312.5 KHz each, as illustrated in diagram 600 of FIG. 11, plotting the minimum output power over the applicable frequency spectrum. Diagram 600 also illustrates the corresponding 802.11 a/g transmit spectrum mask 602.

LAA Signal Detection Using Band-pass Filtering and Power Estimation

Figure 12:
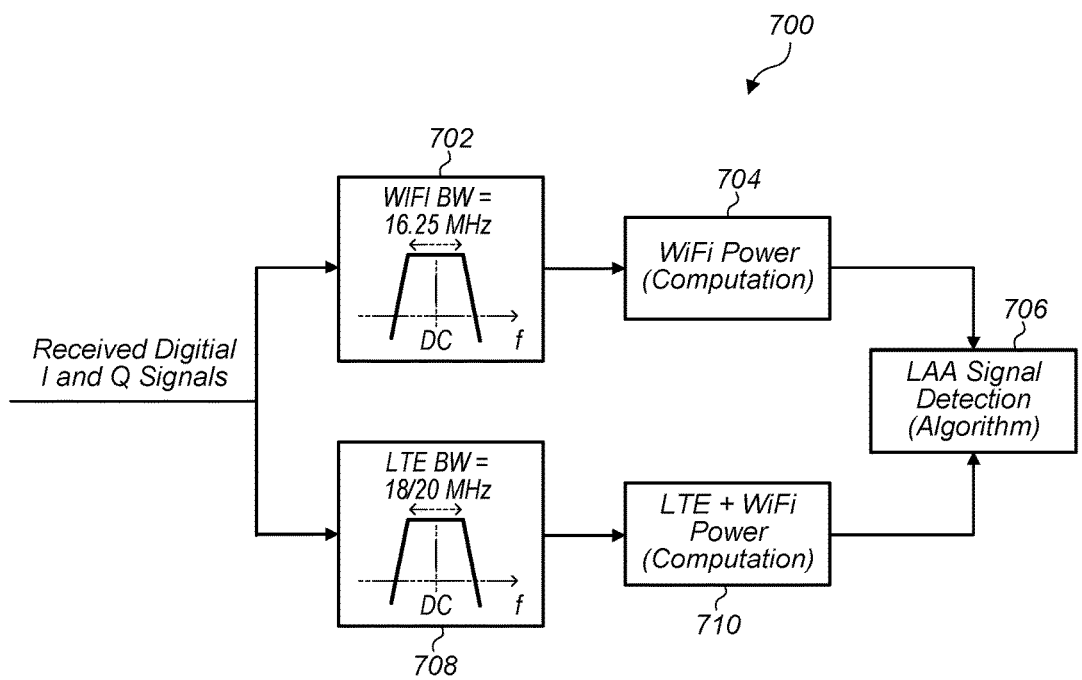
FIG. 12 shows a block diagram illustrating an exemplary method for detecting LAA signals using band-pass filtering and power estimation, according to some embodiments.

FIG. 12 shows a block diagram illustrating an exemplary method for detecting LAA signals using band-pass filtering and power estimation in view of the different characteristics/parameters pertaining to LTE signals and Wi-Fi signals in the same frequency band as discussed above. As shown in FIG. 12, a digital estimation of the power of the baseband signal may be performed (at 704 and 710) after filtering the incoming digital baseband signal through two different complex bandpass filters (702 and 708) having different bandwidths. That is, the received digital baseband signal (e.g. quadrature baseband signals I and Q) is filtered through a first bandpass filter 702 having a BW of 16.25 MHz (associated with Wi-Fi signals present), and is also filtered through a second bandpass filter 708 having a BW of 18/20 MHz (associated with LTE signals and Wi-Fi signals both present). Thus, the filtered signal in the 16.25 MHz bandwidth is used for estimating the power in the Wi-Fi channel (704), and the filtered signal in the 18 MHz (or 20 MHz) bandwidth is used for estimating the power in the LTE channel (710) in view of the power estimate obtained for the Wi-Fi channel. Thus, it is possible to detect an LTE signal based on the power computation obtained based on the filtered signal from filter 702 by comparing the two power estimates (from 704 and 710), for example by obtaining a ratio of linear values corresponding to the power estimates or a difference of dB values corresponding to the power estimates. The results from these power estimations may then be used in/provided to an LAA signal detection algorithm 706.

LAA Power Spectral Density (PSD) Estimation

Figure 13:
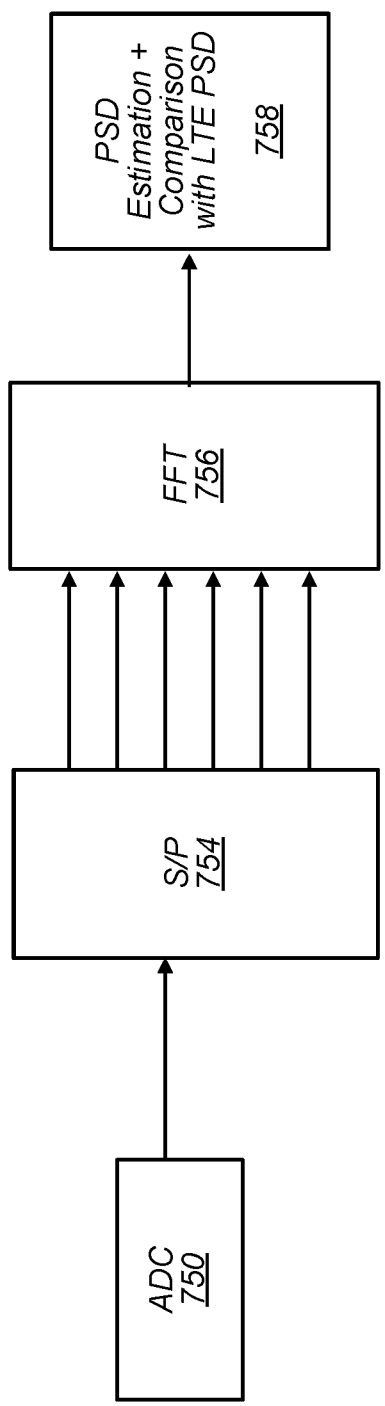
FIG. 13 shows an exemplary block diagram illustrating Power Spectral Density (PSD) estimation, according to some embodiments.

In one set of embodiments, LAA Signal Detection may be performed in a Wi-Fi Receiver through determining/estimating the Power Spectral Density (PSD) of an LAA signal. A Wi-Fi receiver may scan the full unlicensed band for an LTE signal, and/or it may scan for a particular channel in the frequency domain. In case of a full band scan, a PSD estimate for the unlicensed band may be obtained, and an algorithm may be used for detecting an LTE signal based on the PSD estimate. The algorithm may be devised to correlate the captured/estimated PSD with an LTE OFDM signal. In the case of the presence of an LTE signal (per the PSD), the correlation will be of a shape of a rectangle. In other words, if the correlation of the PSD has the shape of rectangle over an 18 MHz bandwidth, it indicates the presence of an LTE signal. The algorithm may also be devised to incorporate conditions on the flatness of the spectrum within the transmit band and spectrum drop at the edge[s] of the 18 MHz transmit band. Accounting for these conditions may help improve the detectability since LTE and Wi-Fi are represented by different transmit masks due to different requirements and different shaping filters used in RF. In some embodiments, PSD estimation may be performed through a periodogram, which is the Fourier transform of the autocorrelation of the signal. The basic flow of such estimation is illustrated by the exemplary block diagram shown in FIG. 13. The hardware complexity of such a solution may be rather simple, and may not require any RF hardware modifications with respect to already existing RF hardware. For example, I/Q samples at the output of the ADC (750) in Wi-Fi may be used to build a periodogram (through 754 and 756)—e.g. by performing DSP operations that may already be available in the Wi-Fi transceiver—without requiring any specific LTE receiver implementations. The PSD estimation may be obtained based on the periodogram (via 758).

LAA Synchronization Signal Detection

Figure 14:
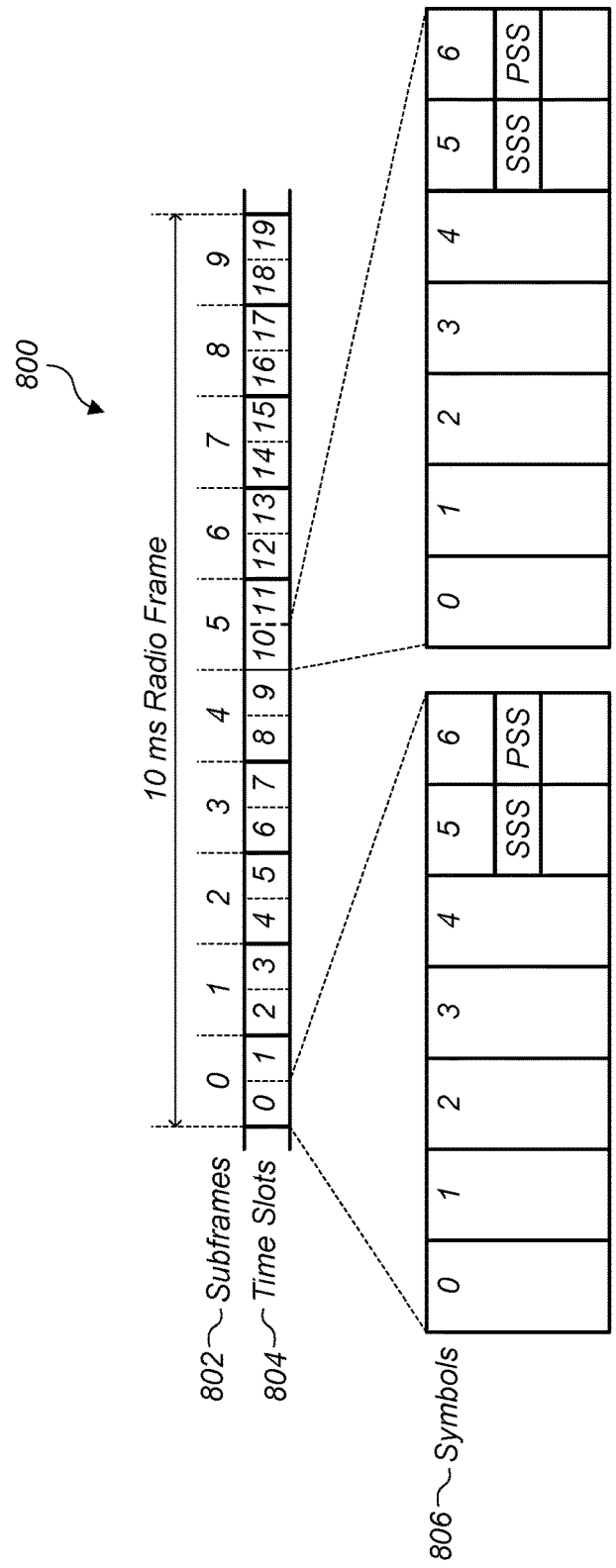
FIG. 14 shows a diagram of an exemplary radio frame, indicating subframes and time slots within the subframes to indicate when Primary Synchronization Signal (PSS) and Secondary Synchronization Signal (SSS) are transmitted.

In one set of embodiments, LAA Signal Detection may be performed in a Wi-Fi Receiver through the detection of LAA synchronization signal detection, e.g. through detecting a primary synchronization signal (PSS) and/or secondary synchronization signal (SSS). Both the FDD (Frequency Division Duplex) and TDD (Time Division Duplex) versions of LAA broadcast synchronization signals in the downlink direction include PSS and SSS. The PSS and SSS are broadcast during DRS (demodulation reference signal) occasions in LAA (the DRS occasion is set by the eNB, i.e. by the base station). The primary synchronization signal (PSS) is typically based on a predetermined Zadoff-Chu sequence giving the cell identity within the group. Three possible Zadoff-Chu sequences (25, 29, and 34) may be used. FIG. 14 shows a diagram of an exemplary radio frame, indicating subframes and time slots within the subframes to indicate when PSS and SSS are transmitted.

In order to detect LAA, the wireless communication device (e.g. via the Wi-Fi controller 351 within UE 106 shown in FIG. 3) may receive any signal in its operating frequency. However, instead of rejecting a signal without Wi-Fi Preamble —that is, without rejecting a signal received within the frequency band but not associated with the RAT the device is expecting the signal to be associated with—the receiver may look for the LAA PSS. For example, the Wi-Fi controller may use x-correlation in the time domain between the received signal x(m) and the three possible Zadoff-Chu sequences Z(m). As mentioned above, in some embodiments, three possible Zadoff-Chu sequences (25, 29, and 34) may be used. The detected PSS signal may then be obtained based on the following equation:

$$D(n) = \sum_{m=1}^{N} x(m+n)Z^*(m)$$

Figure 15:
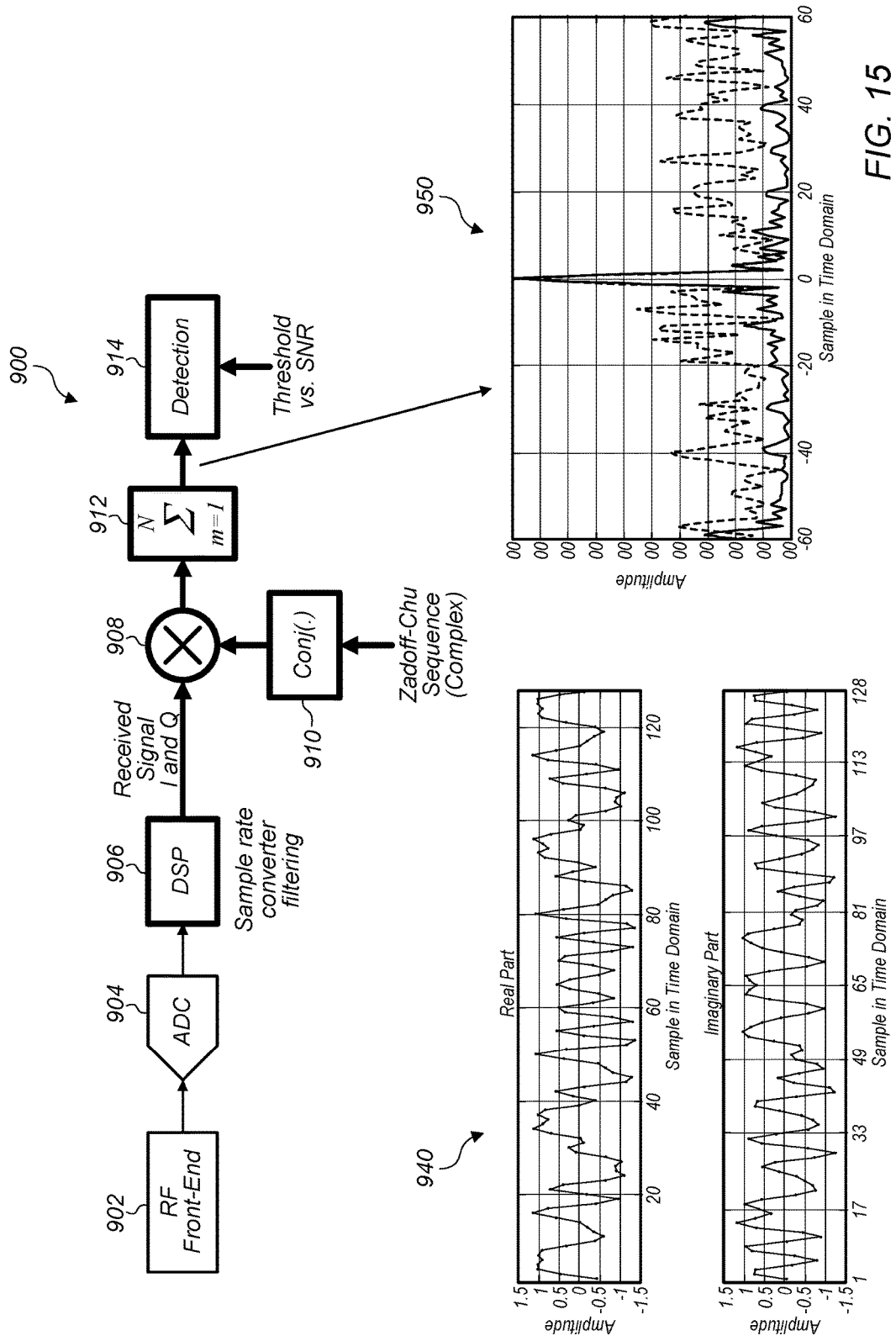
FIG. 15 shows a control diagram illustrating an exemplary system/method for a Wi-Fi controller to perform x-correlation between a received signal and Zadoff-Chu sequences for detecting an LTE PSS, according to some embodiments.
Figure 16:
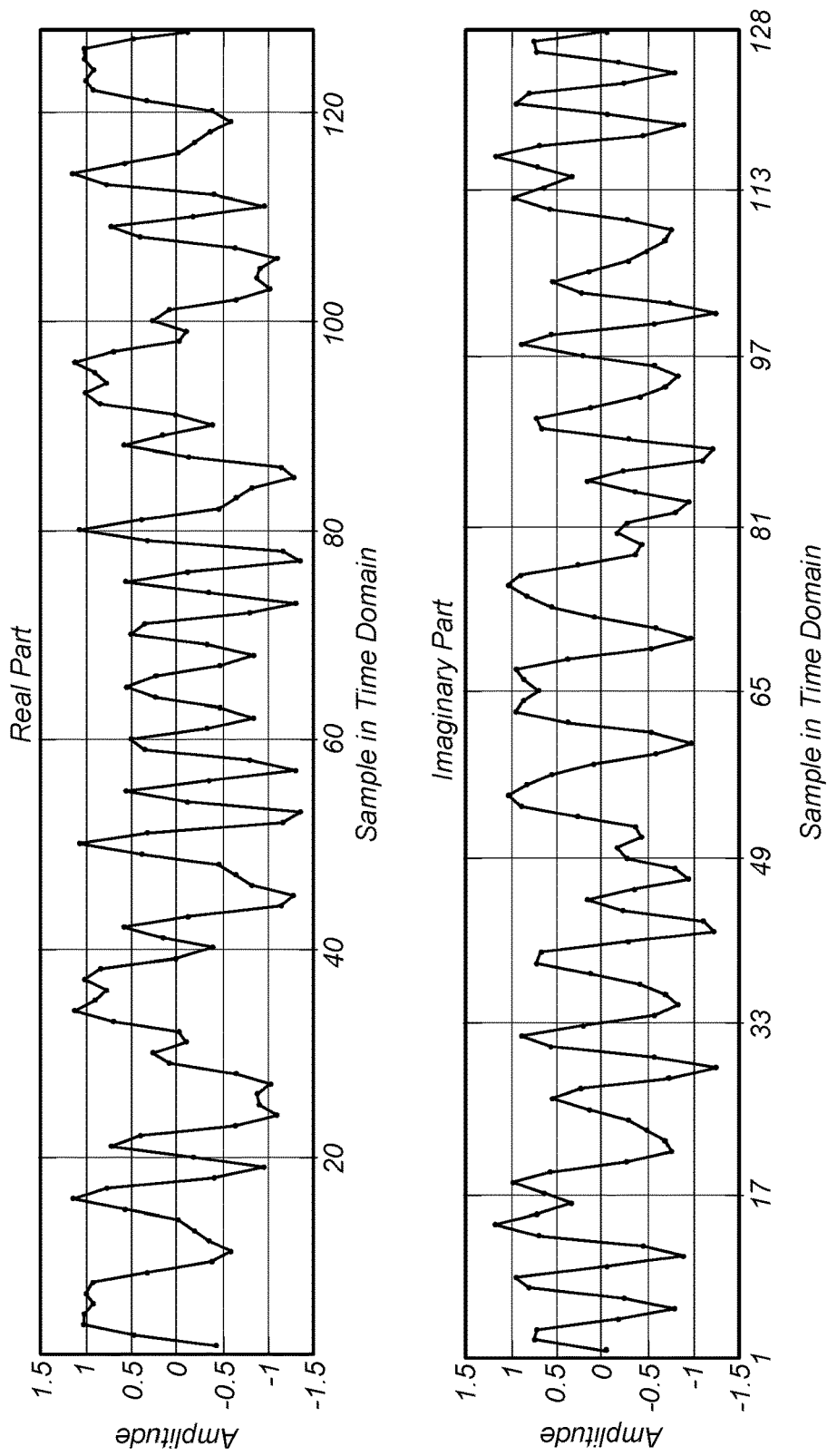
FIG. 16 shows a more detailed version of the signal diagrams for Zadoff-Chu sequence 34 from FIG. 15.

In the equation above, "n" refers to the length of the sequence. FIG. 15 shows a control diagram 900 illustrating an exemplary system/method for a Wi-Fi controller to perform x-correlation between a received signal x(m) and the Zadoff-Chu sequences for detecting an LTE PSS. As shown in FIG. 15, the signal from a front-end RF circuit 902 may be provided to an analog to digital converter (ADC) 904, and digital signal processing (e.g. sample rate converter filtering) may be performed on the digitized signal (at 906). The resulting quadrature signals may be provided to mixer 908 to correlate with the given Zadoff-Chu sequence (910), generating the samples in 912 which are then used for the threshold vs. signal to noise (SNR) ratio comparison in 914. FIG. 15 also includes signal diagrams 940 plotting the respective amplitudes versus time of the real part and imaginary part of Zadoff-Chu sequence 34. Signal diagram 950 plots the amplitude versus time of the detected signal output from 912. FIG. 16 shows a more detailed version of the respective signal diagrams 940 (Real part and Imaginary part) for Zadoff-Chu sequence 34.

LAA/LTE-U Small Cells Crowdsourcing

In some embodiments, peer-to-peer connections may be used for LAA/LTE-U small cells crowdsourcing. No hardware or system changes in the Wi-Fi controller/hardware may be required to detect the presence of LAA communications. In this case, two semi-static approaches may be used to "detect" LAA presence in the channel.

A first approach may be based on crowd sourcing and peer-to-peer connectivity. The Wi-Fi controller may be updated, e.g. by feedback, from newer UEs, with the detected LAA channels and the locations. Wi-Fi devices may use Wi-Fi positioning to estimate their respective positions and correlate the (respective) position with peer-to-peer data in order to retrieve operating LAA cells and their operating channels.

A second approach may be applicable to devices that are also cellular capable in addition to being Wi-Fi capable. If the LTE RRC signaling indicates that CA (carrier aggregation) in the 5 GHz band is supported in the eNB, and the NW (e.g. eNB) provides carrier combinations within 5 GHz, then the cellular controller (e.g. controller 352 shown in FIG. 3 for UE 106) may share this information with the Wi-Fi controller and/or Wi-Fi driver in the UE. The Wi-Fi driver (and/or Wi-Fi controller) may use this information to perform Wi-Fi performance mitigation in the frequencies/channels where LAA/LTE-U cells are known to operate.

Wi-Fi/AP Extension Support for LAA Impact Mitigation

Figure 17:
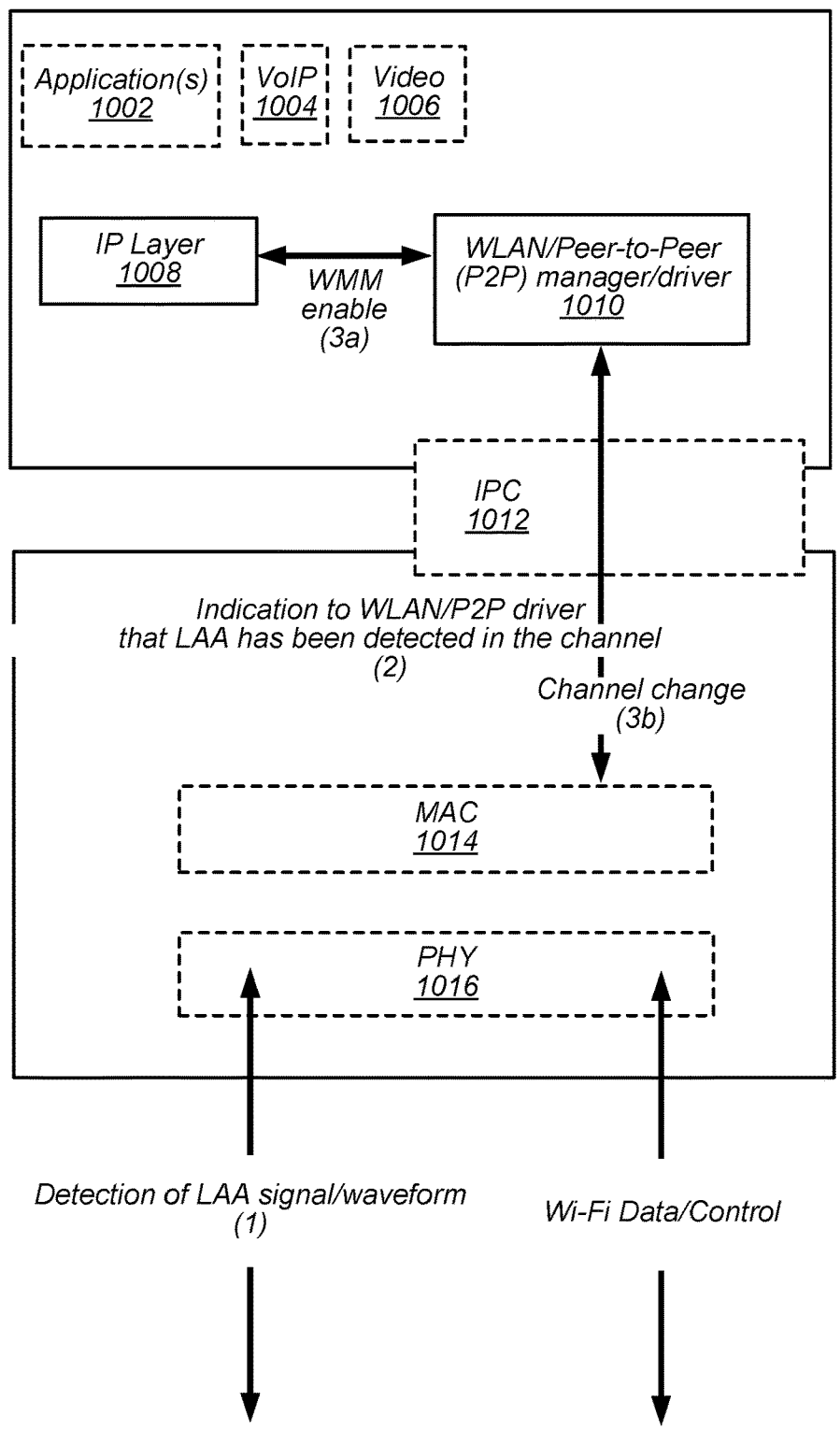
FIG. 17 shows a block diagram illustrating interaction between architectural layers within a wireless communication device to mitigate LAA impact on Wi-Fi communications, according to some embodiments.

FIG. 17 shows a block diagram illustrating interaction between architectural layers within a wireless communication device to mitigate LAA impact on Wi-Fi communications. In some embodiments, WLAN/Wi-Fi (peer-to-peer) driver 1010 may be configured to perform Wi-Fi/LAA impact mitigation. As shown in FIG. 17, a WLAN/Wi-Fi peer-to-peer manager/driver 1010 may communicate across an IPC (Inter-Process Communication) layer 1012 with the MAC layer 1014 to mitigate LAA effects on Wi-Fi communications. Detection of an LAA signal/waveform at the physical layer (PHY) 1016 may be indicated to the WLAN/Wi-Fi peer-to-peer driver/manager 1010, (which may be WMM enabled) and possibly change the Wi-Fi communication channel in response to the LAA signal/waveform detection. Possible types of Wi-Fi communications that may be taking place include data transmissions associated with application(s) 1002, VoIP 1004 and/or video 1006.

Figure 18:
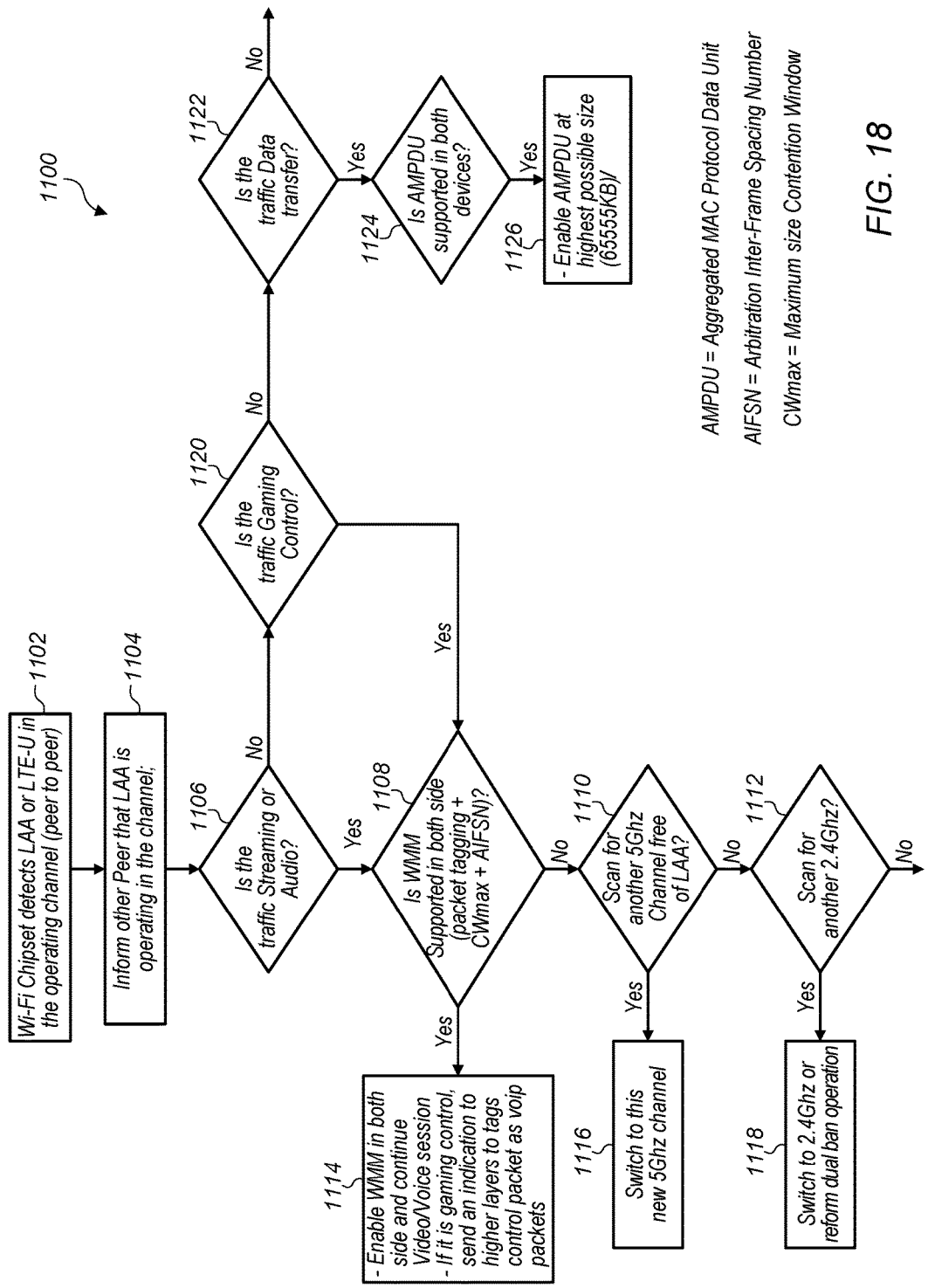
FIG. 18 shows a flow diagram of an exemplary method for mitigating LAA impact on Wi-Fi communications in peer-to-peer mode of operation, according to some embodiments.

FIG. 18—Flow Diagram of Exemplary Method for LAA Impact Mitigation in Peer-to-peer Mode of Operation FIG. 18 shows a flow diagram 1100 of an exemplary method for mitigating LAA impact on Wi-Fi communications in peer-to-peer mode of operation, according to some embodiments. As shown in FIG. 18, a Wi-Fi controller in a wireless communication device (e.g. Wi-Fi controller 351 shown in FIG. 3 for UE 106) or any device communicating over Wi-Fi in a peer-to-peer mode may detect the presence of cellular communications in the operating channel within frequency band in which the Wi-Fi communications are taking place, e.g. in the 5 GHz band (1102). More specifically, the Wi-Fi controller may detect the presence of LAA/LTE-U signals/communications in the operating channel within the 5 GHz band while performing Wi-Fi communications over the operating channel. The Wi-Fi controller may inform the other peer of the peer-to-peer connection that LAA/LTE-U communications are present in the operating channel (1104), and may perform various tasks to determine a most appropriate course of action to mitigate the effects of the LAA/LTE-U communications on the peer-to-peer Wi-Fi communications conducted by the device (which includes the Wi-Fi controller) with the other peer. The tasks may include identifying the traffic type (at 1106, 1120, and 1122), various supported modes of communication (1108), and various supported protocol data units (1124). Based on the identifications, various characteristics and/or parameters of the Wi-Fi communications many be adjusted. Such adjustments may include the adjustments described in 1126, 1114 (in response to an affirmative indication from 1108), 1116 (in response to an affirmative indication from 1110), and 1118 (in response to an affirmative indication from 1112). The adjustment[s] may include switching to an operating channel of another frequency band in order to continue the Wi-Fi communications (1112, 1118).

It should be noted (with reference to at least FIGS. 18-20) that AIFSN refers to Arbitration Inter-Frame Spacing Number and CWmax refers to the maximum size of the Contention Window. AISF and CW are used in Wi-Fi collision avoidance. Packet collisions in Wi-Fi may be avoided/minimized through various Wi-Fi collision avoidance mechanisms which include inter-frame spacing for different high-level frame types (for instance, control versus data frames), and a contention window to introduce randomness into the distributed medium contention logic of radio transmitters since there is no central source of coordination between Wi-Fi stations.

Figure 19:
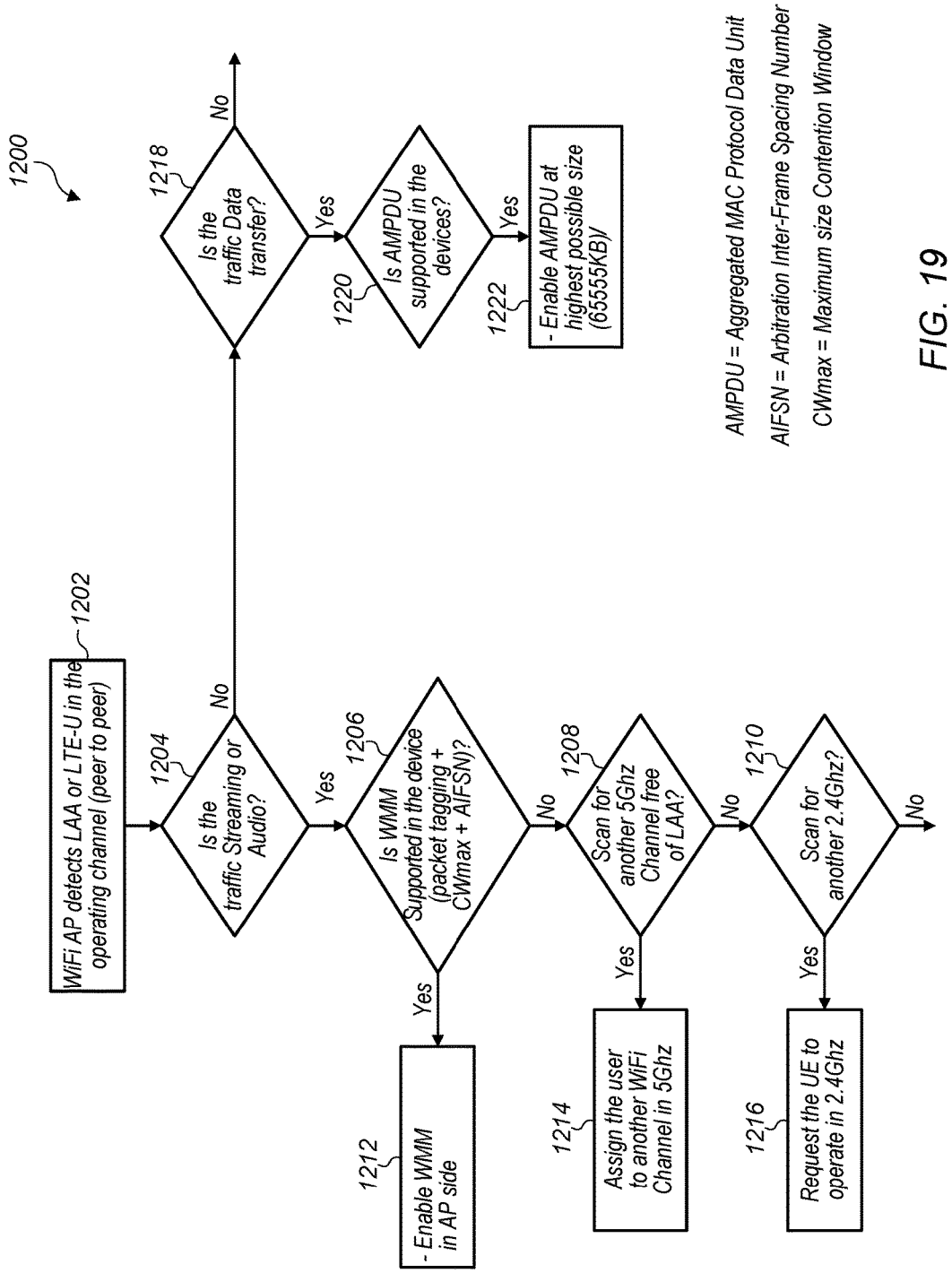
FIG. 19 shows a flow diagram of an exemplary method for mitigating LAA impact on Wi-Fi communications in Access Point (AP) mode of operation, according to some embodiments.

FIG. 19—Flow Diagram of Exemplary Method for LAA Impact Mitigation in AP Mode of Operation FIG. 19 shows a flow diagram 1200 of an exemplary method for mitigating LAA impact on Wi-Fi communications in AP mode of operation, according to some embodiments. As shown in FIG. 19, a Wi-Fi access point (AP) device communicating over Wi-Fi may detect the presence of cellular communications in the peer-to-peer operating channel within frequency band in which the Wi-Fi communications are taking place, e.g. in the 5 GHz band (1202). More specifically, the Wi-Fi AP may detect the presence of LAA/LTE-U signals/communications in the operating channel within the 5 GHz band while performing Wi-Fi communications over the operating channel. The Wi-Fi AP may perform various tasks to determine a most appropriate course of action to mitigate the effects of the LAA/LTE-U communications on the Wi-Fi communications conducted by the Wi-Fi AP (which may include a Wi-Fi controller performing these tasks). The tasks may include identifying the traffic type (1204, 1218), various supported modes of communication (1206), and various supported protocol data units (1220). Based on the identifications, various characteristics and/or parameters of the Wi-Fi communications many be adjusted. Such adjustments may include the adjustments described in 1222, 1212 (in response to an affirmative indication from 1206), 1214 (in response to and affirmative indication from 1208), and 1216 (in response to an affirmative indication from 1210). The adjustment[s] may include switching to an operating channel of another frequency band in order to continue the Wi-Fi communications (1210, 1216).

FIG. 20—Flow Diagram of Exemplary Method for LAA Impact Mitigation in Station Mode of Operation FIG. 20 shows a flow diagram 1300 of an exemplary method for mitigating LAA impact on Wi-Fi communications in station mode of operation, according to some embodiments. As shown in FIG. 18, a Wi-Fi station communicating over Wi-Fi with another peer may detect the presence of cellular communications in the operating channel within frequency band in which the Wi-Fi communications are taking place, e.g. in the 5 GHz band (1302). More specifically, the Wi-Fi station may detect the presence of LAA/LTE-U signals/communications in the operating channel within the 5 GHz band while performing Wi-Fi communications over the operating channel. The Wi-Fi AP station may perform various tasks to determine a most appropriate course of action to mitigate the effects of the LAA/LTE-U communications on the Wi-Fi communications conducted by the Wi-Fi station (which may include a Wi-Fi controller performing these tasks). The tasks may include identifying the traffic type (1304, 1318), various supported modes of communication (1306), and various supported protocol data units (1320). Based on the identifications, various characteristics and/or parameters of the Wi-Fi communications many be adjusted. Such adjustments may include the adjustments described in 1322, 1312 (in response to an affirmative indication from 1306), 1314 (in response to and affirmative indication from 1308), and 1316 (in response to an affirmative indication from 1310). The adjustment[s] may include switching to an operating channel of another frequency band in order to continue the Wi-Fi communications (1310, 1316).

Embodiments of the present invention may be realized in any of various forms. For example, in some embodiments, the present invention may be realized as a computer-implemented method, a computer-readable memory medium, or a computer system. In other embodiments, the present invention may be realized using one or more custom-designed hardware devices such as ASICs. In other embodiments, the present invention may be realized using one or more programmable hardware elements such as FPGAs.

In some embodiments, a non-transitory computer-readable memory medium (e.g., a non-transitory memory element) may be configured so that it stores program instructions and/or data, where the program instructions, if executed by a computer system, cause the computer system to perform a method, e.g., any of a method embodiments described herein, or, any combination of the method embodiments described herein, or, any subset of any of the method embodiments described herein, or, any combination of such subsets.

In some embodiments, a device (e.g., a UE) may be configured to include a processor (or a set of processors) and a memory medium (or memory element), where the memory medium stores program instructions, where the processor is configured to read and execute the program instructions from the memory medium, where the program instructions are executable to implement any of the various method embodiments described herein (or, any combination of the method embodiments described herein, or, any subset of any of the method embodiments described herein, or, any combination of such subsets). The device may be realized in any of various forms.

Although the embodiments above have been described in considerable detail, numerous variations and modifications will become apparent to those skilled in the art once the above disclosure is fully appreciated. It is intended that the following claims be interpreted to embrace all such variations and modifications.

The invention claimed is:

1. An apparatus comprising:
a memory element storing information; and
a processing element configured to use at least a portion of the information to cause a user equipment device (UE) to:
conduct first wireless communications in a first frequency band according to a first radio access technology (RAT), wherein the first wireless communications comprise Wi-Fi communications;
receive information from one or more other UEs during the first communications, wherein the information is associated with respective wireless communications conducted according to a second RAT by the one or more other UEs;
receive a signal in the first frequency band as part of the first communications, determine that the signal lacks an expected preamble associated with the first RAT, and detect that the signal is a synchronization signal associated with the second RAT partially in response to determining that the signal lacks the expected preamble;
determine, based at least on the received information and the detected synchronization signal, that there is a presence of second wireless communications conducted in the first frequency band according to the second RAT while the UE is conducting the first wireless communications, wherein the second wireless communications comprise cellular radio communications; and
adjust the first wireless communications at least in response to and based on the detected second wireless communications.

2. The apparatus of claim 1, wherein the first frequency band is an unlicensed frequency band for the second wireless communications.

3. The apparatus of claim 1, wherein the UE is operating as one of:
a peer-to-peer device;
an access point; or
a station.

4. The apparatus of claim 1, wherein the processing element is configured to further cause the UE to detect an interfering second-RAT signal, wherein to detect the interfering second-RAT signal, the processing element is configured to cause the UE to:

bandpass filter, according to a first bandwidth, a signal received during the first wireless communications to produce a first filtered signal;
bandpass filter, according to a second bandwidth, the received signal to produce a second filtered signal; and
determine a presence of the interfering second-RAT signal based on the first filtered signal and the second filtered signal.

5. The apparatus of claim 1, wherein the processing element is configured to further cause the UE to detect interfering second-RAT signals by performing one or more of the following:
scanning the entire first frequency band;
scanning, in the frequency domain, a particular channel of the first frequency band; or
passively receiving signals when operating in a specific channel of the first frequency band.

6. The apparatus of claim 5, wherein when scanning the entire first frequency band, the processing element is configured to cause the UE to obtain a power spectral density (PSD) for the first frequency band.

7. The apparatus of claim 6, wherein the processing element is configured to further cause the UE to:
perform a correlation of the obtained PSD with a specific second-RAT signal; and
detect an interfering second-RAT signal of the interfering second-RAT signals based on the correlation.

8. The apparatus of claim 6, wherein the processing element is configured to further cause the UE to obtain the PSD by performing a Fourier transform of an autocorrelation of a signal received during the first wireless communications.

9. The apparatus of claim 1, wherein the processing element is configured to cause the UE to detect that the signal is a synchronization signal associated with the second RAT by using time domain x-correlation between the signal and one or more possible complex-valued mathematical sequences.

10. The apparatus of claim 1, wherein the UE is preconfigured with a list of known frequencies and/or known channels over which the second wireless communications are conducted.

11. A user equipment device (UE) comprising:
first radio circuitry configured to facilitate wireless communications of the UE according to a first radio access technology (RAT);
second radio circuitry configured to facilitate wireless communications of the UE according to a second RAT; and
a processing element configured to interoperate with the first radio circuitry and the second radio circuitry to cause the UE to:
conduct first wireless communications in a first frequency band according to the first RAT;
receive information from one or more other UEs during the first communications, wherein the information is associated with respective wireless communications conducted according to a second RAT by the one or more other UEs;
receive a signal in the first frequency band as part of the first communications, determine that the signal lacks an expected preamble associated with the first RAT, and detect that the signal is a synchronization signal associated with the second RAT partially in response to determining that the signal lacks the expected preamble;
determine, based at least on the received information and the detected synchronization signal, that there is a presence of second wireless communications conducted in the first frequency band according to the second RAT while the UE is conducting the first wireless communications; and
adjust the first wireless communications at least in response to and based on the determined presence of the second wireless communications.

12. The UE of claim 11, wherein the processing element is configured to interoperate with the first radio circuitry and the second radio circuitry to further cause the UE to detect an interfering second-RAT signal, wherein to detect the interfering second-RAT signal, the processing element is configured to interoperate with the first radio circuitry and the second radio circuitry to cause the UE to:
bandpass filter, according to a first bandwidth, a signal received during the first wireless communications to produce a first filtered signal;
bandpass filter, according to a second bandwidth, the received signal to produce a second filtered signal; and
determine a presence of the interfering second-RAT signal based on the first filtered signal and the second filtered signal.

13. The UE of claim 11, wherein the processing element is configured to interoperate with the first radio circuitry and the second radio circuitry to further cause the wireless communication device to detect interfering second-RAT signals by performing one or more of the following:
scanning the entire first frequency band;
scanning, in the frequency domain, a particular channel of the first frequency band; or
passively receiving signals when operating in a specific channel of the first frequency band.

14. The UE of claim 13, wherein the processing element is configured to interoperate with the first radio circuitry and the second radio circuitry to further cause the wireless communication device to:
when scanning the entire first frequency band, obtain a power spectral density (PSD) for the first frequency band;
perform a correlation of the obtained PSD with a specific second-RAT signal; and
detect an interfering second-RAT signal of the interfering second-RAT signals based on the correlation.

15. The UE of claim 11, wherein the processing element is configured to interoperate with the first radio circuitry and the second radio circuitry to further cause the UE to detect that the signal is a synchronization signal associated with the second RAT by using time domain x-correlation between the signal and one or more possible complex-valued mathematical sequences.

16. A non-transitory memory element storing instructions executable by a processing element to cause a user equipment device (UE) to:
conduct first wireless communications in a first frequency band according to a first radio access technology (RAT);
receive information from one or more other UEs during the first communications, wherein the information is associated with respective wireless communications conducted according to a second RAT by the one or more other UEs;
receive a signal in the first frequency band as part of the first communications, determine that the signal lacks an expected preamble associated with the first RAT, and detect that the signal is a synchronization signal associated with the second RAT partially in response to determining that the signal lacks the expected preamble;

determine, based at least on the received information and the detected synchronization signal, that there is a presence of second wireless communications conducted in the first frequency band according to the second RAT while the UE is conducting the first wireless communications; and adjust the first wireless communications at least in response to and based on the determined presence of the second wireless communications.

17. The non-transitory memory element of claim 16, wherein the instructions are executable by the processing element to further cause the UE to detect an interfering second-RAT signal, wherein to detect the interfering second-RAT signal, the instructions are executable by the processing element to cause the UE to:

produce a first filtered signal by bandpass filtering, according to a first bandwidth, a received signal during the first wireless communications;

produce a second filtered signal by bandpass filtering, according to a second bandwidth, the received signal; and determine a presence of the interfering second-RAT signal based on the first filtered signal and the second filtered signal.

18. The non-transitory memory element of claim 16, wherein the instructions are executable by the processing element to further cause the UE to:

to detect interfering second-RAT signals by performing one or more of the following:
scanning the entire first frequency band;
scanning, in the frequency domain, a particular channel of the first frequency band; or
passively receiving signals when operating in a specific channel of the first frequency band.

19. The non-transitory memory element of claim 18, wherein the instructions are executable by the processing element to further cause the UE to:

when scanning the entire first frequency band, obtain a power spectral density (PSD) for the first frequency band;
perform a correlation of the obtained PSD with a specific second-RAT signal; and
detect an interfering second-RAT signal of the interfering second-RAT signals based on the correlation.

20. The non-transitory memory element of claim 16, wherein the instructions are executable by the processing element to cause the UE to detect that the signal is a synchronization signal associated with the second RAT by using time domain x-correlation between the signal and one or more possible complex-valued mathematical sequences.

* * * * *